(12) United States Patent
Nomura et al.

(10) Patent No.: US 7,070,839 B2
(45) Date of Patent: Jul. 4, 2006

(54) FUNCTIONAL FILM, METHOD OF FABRICATING THE SAME, LIQUID CRYSTAL DISPLAY DEVICE USING FUNCTIONAL FILM, AND METHOD OF FABRICATING THE SAME

(75) Inventors: Takaiki Nomura, Osaka (JP); Kazufumi Ogawa, Nara (JP); Tadashi Otake, Neyagawa (JP); Takako Takebe, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/464,518

(22) Filed: Jun. 19, 2003

(65) Prior Publication Data
US 2003/0211342 A1  Nov. 13, 2003

Related U.S. Application Data

(63) Continuation of application No. 09/787,240, filed on Mar. 16, 2001, now abandoned.

(30) Foreign Application Priority Data
Sep. 16, 1998 (JP) ............... H10-262031
Aug. 31, 1999 (JP) ............... H11-246661

(51) Int. Cl.
C09K 19/38 (2006.01)
B32B 25/20 (2006.01)
B32B 9/04 (2006.01)

(52) U.S. Cl. ............... 428/1.23; 428/1.32; 428/1.52; 428/429; 428/446; 428/447; 428/448

(58) Field of Classification Search ............... 428/1.23, 428/1.32, 1.52, 429, 446, 447, 448
See application file for complete search history.

(56) References Cited

U.S. PATENT DOCUMENTS

| 5,173,342 | A | * | 12/1992 | Sato et al. ............... 428/1.23 |
| 5,196,227 | A | | 3/1993 | Ogawa et al. |
| 5,378,521 | A | | 1/1995 | Ogawa et al. ............... 428/85 |
| 5,766,673 | A | | 6/1998 | Nogami et al. ............... 427/58 |
| 5,824,377 | A | | 10/1998 | Pirwitz et al. ............... 428/1.23 |
| 6,013,331 | A | | 1/2000 | Ogawa ............... 427/515 |
| 6,054,190 | A | | 4/2000 | Ogawa et al. ............... 427/510 |
| 6,465,108 | B1 | | 10/2002 | Kamitani et al. ............... 428/448 |

FOREIGN PATENT DOCUMENTS

| EP | 0 441 326 | 8/1991 |
| EP | 0 445 534 | 9/1991 |
| EP | 0 484 746 | 10/1991 |
| EP | 0 476 543 | 3/1992 |
| JP | 2891103 | 2/1992 |
| JP | 4-221630 | 8/1992 |
| JP | 4-285566 | 10/1992 |
| JP | 586353 | 4/1993 |
| JP | 5-318604 | 12/1993 |
| JP | 6-230394 | 8/1994 |
| JP | 6-234775 | 8/1994 |
| JP | 7-114029 | 5/1995 |
| JP | 7-149512 | 6/1995 |
| JP | 7-186319 | 7/1995 |
| JP | 7-328538 | 12/1995 |
| JP | 8-002943 | 1/1996 |
| JP | 10-120979 | 5/1998 |
| JP | 11-167114 | 6/1999 |
| JP | 11-181127 | 7/1999 |

OTHER PUBLICATIONS

Database WPI, XP-002299397.
Database WPI, XP-002299398.
Machine Translation of JP 07-149512 A, obtained from JPO website Jun.-1995.
Machine Translation of JP 07-186,319 A, obtained from JPO website, Jul.-1995.

* cited by examiner

Primary Examiner—Jeffrey B. Robertson
(74) Attorney, Agent, or Firm—Steptoe & Johnson LLP

(57) ABSTRACT

The present invention is characterized in that an underlying layer solution containing a hydrolyzable compound represented by $$X\text{—}(SiOX_2)_n\text{—}SiX_3$$

(where X is at least one functional group selected from the group consisting of a halogen, an alkoxy group, and an isocyanate group and n is an integer equal to or more than 0) is brought into contact with a surface of a base material, the underlying layer solution is dried at a temperature less than 300° C. to form an underlying layer, a solution containing a silane-based compound is brought into contact with a surface of the underlying layer to cause chemical adsorption of the molecules of the silane-based compound to the surface of the underlying layer, and the base material is sintered at a temperature of 300° C. or more. This improves the water repellency, resistance, and heat resistance of a functional film composed of the silane-based compound, which is for modifying the properties of the surface of the base material.

37 Claims, 18 Drawing Sheets

FUNCTIONAL FILM, METHOD OF FABRICATING THE SAME, LIQUID CRYSTAL DISPLAY DEVICE USING FUNCTIONAL FILM, AND METHOD OF FABRICATING THE SAME

This is a Continuation of application Ser. No. 09/787,240 filed Mar. 16, 2001, now abandoned.

TECHNICAL FIELD

The present invention relates to a functional film formed on a surface of a base material to modify the properties of the surface of the base material, a method of fabricating the same, a liquid crystal display device using the functional film as a liquid crystal alignment film, and a method of fabricating the same.

BACKGROUND ART

There have conventionally been used means for modifying the properties of a surface of a base material to impart water repellency, an anti-contamination property, and the function of aligning a liquid crystal thereto. As an example of such means, there is a method of coating the base material with a solution containing a trichlorosilane-based compound, a silane coupling agent, or the like to cause chemical adsorption of a coating component to the surface of the base material. In accordance with the method, solute molecules as the coating component are strongly bonded to the base material by chemical adsorption, so that a high-resistance coating is formed. If the surface of the base material has a reduced number of active hydrogens such as hydroxyl groups, however, a coarse coating having a low density of adsorbed molecules is formed. With such a coating, the object of modifying the surface properties cannot be attained satisfactorily.

With respect to a base material having a low density of active hydrogens, therefore, there has been adopted a method of bonding and fixing a coating film to the base material via an underlying layer by using the technology of preliminarily coating a sol-gel solution containing $SiO_2$ or the like as a main component, sintering the sol-gel solution to form the underlying layer having a high density of active hydrogens on the surface, and applying a coating solution containing a silane coupling or the like. The method increases the resistance of the coating compared with a method of directly applying the base material with the coating solution. However, a functional film formed by using the prior art technology is not satisfactory in terms of adhesion to the base material, uniformity of the coating, resistance, and the like so that a further improvement is expected.

There can also be considered a method of preliminarily mixing $SiO_2$ in a solution containing a silane coupling agent, a trichlorosilane-based compound, or the like and coating the mixture directly onto the base material to simplify the operation of forming the underlying layer and increase the density of active hydrogens. In accordance with the method, however, the silane coupling agent, the trichlorosilane-based compound, or the like is segregated at the interface between the substrate and the functional film and therefore the adhesion between the substrate and the functional film cannot be increased.

Since the resistance of a functional film is also dependent on the resistance of the underlying layer, an underlying layer with resistance higher than that of the $SiO_2$ film is desired for a functional film with higher resistance.

DISCLOSURE OF THE INVENTION

The present invention has been achieved in view of the foregoing and it is therefore an object of the present invention to provide a functional film excellent in coating uniformity relative to a base material, adhesion thereto, and resistance and a method of fabricating the same. Another object of the present invention is to provide a liquid crystal display device using the functional film as a liquid crystal alignment film and a method of fabricating the same.

To attain the object, the functional film of the present invention has the following arrangements.

(1) A functional film according to a first embodiment of the present invention comprises: an underlying layer formed on a surface of a base material and composed of a hydrolyzable compound represented by

(where X is at least one functional group selected from the group consisting of a halogen, an alkoxy group, and an isocyanate group and n is an integer equal to or more than 0); and a thin film provided on the underlying layer and composed of a group of molecules of a silanebased compound chemically adsorbed to a surface of the underlying layer, constituent molecules composing the underlying layer being fixed by chemical bonding to the surface of the base material and to the molecules of the silanebased compound, of portions of active hydrogens of the constituent molecules, those ones remaining without being chemically bonded to the molecules of the silanebased compound being chemically bonded to each other such that the constituent molecules are bonded fixedly to each other to have a structural unit represented by the following structural formula (1)

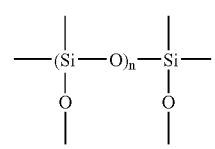

(where n is an integer equal to or more than 0).

In the arrangement, the constituent molecules of the underlying layer are polymerized and some of the constituent molecules are chemically bonded to the base material so that an underlying layer strongly fixed to the base material is formed. Since the underlying layer is provided with the thin film composed of the molecules of the silanebased compound chemically adsorbed at a high density thereto, a uniform and high-quality functional film with high resistance is formed.

(2) A functional film according to a second embodiment of the present invention comprises: an underlying layer formed on a surface of a base material and composed of a hydrolyzable compound represented by

(where X' is an alkoxy group and n is an integer equal to or more than 0), the underlying layer being bonded fixedly onto the base material via an —O —Al bond and having a structural unit represented by the following structural formula (2); and a thin film composed of a group of molecules of a silanebased compound each chemically bonded to a surface of the underlying layer via an —O—Si bond

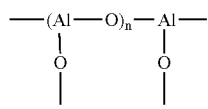

(where n is an integer equal to or more than 0).

Since the underlying layer contains the structural unit represented by the foregoing structural formula (2) and bonded fixedly onto the base material via the —O—Al bond, it is high in resistance, e.g., abrasion resistance and heat resistance. The arrangement allows the formation of a functional film remarkably high in resistance or the like by forming the thin film on the underlying layer.

(3) A functional film according to a third embodiment of the present invention comprises: an underlying layer formed on a surface of a base material and composed of a hydrolyzable compound represented by $$X—(SiOX_2)_n—SiX_3$$

(where X is at least one functional group selected from the group consisting of a halogen, an alkoxy group, and an isocyanate group and n is an integer equal to or more than 0) and a hydrolyzable compound represented by $$X'—(AlOX')_n—AlX'_2$$

(where X' is an alkoxy group and n is an integer equal to or more than 0), the underlying layer being bonded fixedly onto the base material via a siloxane bond and an —O—Al bond and having structural units represented by the following structural formulae (1) and (2), respectively; the functional film being and a thin film composed of a group of molecules of a silanebased compound each chemically bonded to a surface of the underlying layer via an —O—Si bond

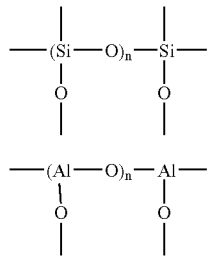

(where n is an integer equal to or more than 0).

In the arrangement, the underlying layer is the thin film which contains structural units different from each other and represented by the structural formulae (1) and (2) and has a dense structure in which the Si-based compound and the Al-based compound coexist mixedly on a molecular level. Accordingly, the thin film provided on the base material via the underlying layer has high density and high resistance. This is because, if the density of the underlying layer is high, adsorption portions are present at a high density in a surface layer so that a larger number of molecules of the silane-based compound are chemically adsorbed to the adsorption portions.

To the functional films according to the first to third embodiments, the following components can further be added.

Each of the molecules of the silane-based compound in the functional films (1) to (3) can be a molecule of a trichlorosilane-based compound. Since the molecules of the trichlorosilane-based compound are bonded directly (chemically adsorbed) to the OH groups exposed at the underlying layer by covalent bonding without undergoing the polymerization reaction thereof, the molecules of the trichlorosilane-based compound can be adsorbed chemically at a high density so that a functional film having a surface-property modifying effect such as water repellency or liquid crystal alignment property resistant to degradation is fabricated.

Each of the molecules of the silane-based compound preferably has a straight carbon chain. This is because, if each of the molecules of the silane-based compound has the straight carbon chain, the molecules of the silane-based compound are aligned orderly on the substrate to achieve high-density chemical adsorption and the surfacemodifying effect such as water repellency or liquid crystal alignment property is resistant to degradation.

The straight carbon chain can have an alkyl group or a fluoroalkyl group. The thin film composed of the silane-based compound having an alkyl group or a fluoroalkyl group is preferred in terms of its excellent water repellency or anticontamination property. If the thin film has excellent water repellency, the ingress of water into the space between the underlying layer and the base material is prevented, which further increases resistance. If the thin film is used as the liquid crystal alignment film, any alignment such as a homogeneous, pretilt, or homeotropic alignment is achievable.

The straight carbon chain can have a photosensitive group. A portion of the photosensitive group in the straight carbon chain can be polymerized fixedly in a desired direction. This provides a functional film with increased resistance and, if the functional film is used as a liquid crystal alignment film, the resulting liquid crystal alignment film has excellent alignment stability.

The photosensitive group can be a cinnamoyl group represented by the following chemical formula (3).

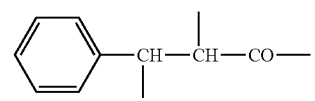

The photosensitive group can be a chalconyl group represented by the following chemical formula (4).

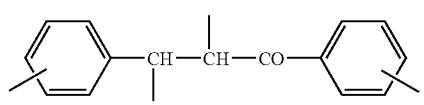

The use of the cinnamoyl group or chalconyl group as the photosensitive group allows polymerization with a low dose of polarized UV light so that a reduction in tact time in a UV irradiation step is achievable.

Each of the functional films (1) to (3) can be a thin film configured as a single molecular layer. In the thin film configured as the single molecular layer, the same functional groups are arranged on the surface of the film so that the function of the functional film effected owing to the functional groups is improved. If the functional groups are $CF_3$ groups, a larger number of $CF_3$ groups are exposed at the surface of the functional film than in the case where the functional film is not the thin film configured as the single molecular layer, so that water repellency is improved. The functional film can also be formed to have excellent alignment property, which is suitable for a liquid crystal alignment film.

The group of molecules of the silane-based compound composing each of the functional films (1) to (3) can be aligned in a given direction. In the arrangement, the functional film can also be formed as a liquid crystal alignment film capable of aligning adjacent liquid crystal molecules in a desired direction.

The base material can be composed of any selected one of glass, stainless steel, and an aluminum oxide. The arrangement allows the formation of a functional film with high resistance on the base material composed of glass, stainless steel, or an aluminum oxide.

As the methods of fabricating the functional films described above, the following embodiments (4) to (6) can be adopted. The embodiments (4) to (6) correspond to the first to third embodiments described above, respectively.

(4) A method of fabricating the functional film according to the first embodiment of the present invention comprises: an underlying-layer forming step of forming an underlying layer composed of a group of constituent molecules having a plurality of portions of active hydrogens and independent of each other by bringing, into contact with a surface of a base material, an underlying layer solution containing a hydrolyzable compound represented by

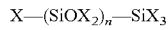

X—(SiOX$_2$)$_n$—SiX$_3$ (where X is at least one functional group selected from the group consisting of a halogen, an alkoxy group, and an isocyanate group and n is an integer equal to or more than 0) and drying the underlying layer solution; a thin-film forming step of forming a thin film composed of a group of molecules of a silane-based compound on a surface of the underlying layer by bringing a solution containing the silane-based compound into contact with the surface of the base material to cause chemical adsorption of each of molecules of the silane-based compound to at least one of the portions of active hydrogens in the constituent molecules; and a sintering step of sintering the base material after the thin-film forming step to cause, of the portions of active hydrogens in the constituent molecules, those ones remaining without chemically adsorbing the molecules of the silane-based compound to be bonded to each other and to the portions of active hydrogens present at the surface of the base material.

In accordance with the foregoing method, the underlying layer is only dried, not sintered in the underlying-layer forming step. However, SiX$_3$ present in a nearsurface portion of the underlying layer reacts with moisture in the drying process to be changed to a compound having an OH group so that the density of active hydrogens as the adsorption portions for the silane-based compound is increased. On the other hand, active hydrogens are not lost due to the temperature during sintering, since sintering is not performed. If the solution containing the silane-based compound is brought into contact with such an underlying layer, the molecules of the silane-based compounds are chemically bonded (also termed chemically adsorbed) to the portions of the active hydrogens present at a high density, which allows the formation of a thin film composed of the molecules of the silane-based compound chemically adsorbed at a high density.

In accordance with the foregoing method, the base material is sintered at the final stage of the fabrication process. As a result of the sintering, the constituent molecules of the underlying layer are polymerized and set to be fixed more strongly to the base material, while some of the constituent molecules are chemically bonded to the base material. Consequently, the underlying layer is strongly fixed to the base material.

Thus, the foregoing fabrication method allows the fabrication of a high-quality functional film wherein a thin film composed of a silane-based compound is bonded uniformly and fixedly to the base material via an underlying layer fixed strongly to the base material. The functional film is high in resistance or the like.

It is to be noted that the silane-based compound is bonded in the form of $R_pSi(O—)_{3-p}$ (where R is a substituent group and P is an integer of 1 to 3) by covalent bonding (chemically adsorbed) to the surface of the base material having the underlying layer.

(5) A method of fabricating the functional film corresponding to the second embodiment of the present invention comprises: an underlying-layer forming step of forming an underlying layer by bringing, into contact with a surface of a base material, an underlying layer solution containing a hydrolyzable compound represented by

X'—(AlOX')$_n$—AlX'$_2$ (where X' is an alkoxy group and n is an integer equal to or more than 0) and drying the underlying layer solution; a thin-film forming step of forming a thin film by bringing a thin-film forming solution containing a silane-based compound into contact with the surface of the base material formed with the underlying layer to cause chemical adsorption of molecules of the silane-based compound to the surface of the base material; and a sintering step of sintering the base material after the thin-film forming step.

The underlying-layer forming step of the foregoing method is characterized in that the underlying layer is only dried, not sintered. In the arrangement, Al—X' present in a nearsurface portion of the underlying layer reacts with moisture to be changed to a compound having an Al—OH group in the drying process so that the density of active hydrogens as the adsorption portions for the molecules of the silane-based compound is increased. On the other hand, active hydrogens are not lost due to the temperature during sintering, since sintering is not performed. If the solution containing the silane-based compound is brought into contact with such an underlying layer, the molecules of the silane-based compound are chemically bonded (also termed chemical adsorbed) to the portions of active hydrogens present at a high density. This allows the formation of a thin film having the molecules of the silane-based compound chemically adsorbed thereto uniformly at a high density.

In accordance with the foregoing method, the base material is sintered at the final stage of the fabrication process. As a result of the sintering, the components of the underlying layer are polymerized and set to be bonded more strongly to the base material, while some of the constituent molecules are chemically bonded to the base material. Consequently, the underlying layer is strongly fixed to the base material.

The resistance, e.g., abrasion resistance or heat resistance of the functional film is greatly affected by the abrasion resistance and heat resistance of the underlying layer. Since the underlying layer composed of a compound represented by X'—(AlOX')$_n$—AlX'$_2$ is higher in resistance than a SiO$_2$ single layer (main body of the functional film), the arrangement provides a functional film with high resistance. Thus, the arrangement allows the molecules of the silane-based compound to be bonded uniformly and fixedly at a high density to the base material via the underlying layer fixed strongly to the base material. The functional film thus formed is remarkably high in resistance or the like.

The silane-based compound is bonded by covalent bonding (chemically adsorbed) in the form of R$_p$Si(O—)$_{3-p}$ (R is a substituent group and P is an integer of 1 to 3) to the surface of the base material having the underlying layer.

(6) A method of fabricating the functional film corresponding to the third embodiment of the present invention comprises: an underlying-layer forming step of forming an underlying layer by bringing, into contact with a surface of a base material, an underlying layer solution containing a twocomponent mixture composed of a hydrolyzable compound represented by

X—(SiOX$_2$)$_n$—SiX$_3$ (where X is at least one functional group selected from the group consisting of a halogen, an alkoxy group, and an isocyanate group and n is an integer equal to or more than 0) and a hydrolyzable compound represented by

X'—(AlOX')$_n$—AlX'$_2$ (where X' is an alkoxy group and n is an integer equal to or more than 0) and drying the underlying layer solution; a thin-film forming step of forming a thin film by bringing a thin-film forming solution containing a silane-based compound into contact with the surface of the base material formed with the underlying layer to cause chemical adsorption of molecules of the silane-based compound to the surface of the base material; and a sintering step of sintering the base material after the thin-film forming step.

The method is characterized in that the two-component underlying layer solution containing X—(SiOX$_2$)$_n$—SiX$_3$ and X'—(AlOX')$_n$—AlX'$_2$ is used to form the underlying layer. Except for that, the method is for fabricating a functional film similarly to the case of method (4) above. In the arrangement, Al—X' and Si—X present in the near-surface portion of the underlying layer react with moisture in the drying process to be changed to compounds having an Al—OH group and a Si—OH group, respectively, which increases the density of active hydrogens as the adsorption portions for the molecules of the silane-based compound. In the arrangement also, active hydrogens are not lost due to the temperature during sintering, since sintering is not performed similarly to method (4) above.

The arrangement uses the two-component underlying layer solution of the compound and the compound. In the two-component system composed of the Si-based compound and the Al-based compound, the two compounds in different structures coexist mixedly on a molecular level. Compared with the case where either of the compounds is used alone, the underlying layer in a denser structure is formed. As the underlying layer is denser, the density of hydroxyl groups in a surface layer is accordingly higher, so that a larger number of thin-film forming molecules are chemically adsorbed. As a result, a denser functional film is formed and the degradation of water repellency resulting from heat energy is reduced accordingly.

In the methods of fabricating the functional films according to the first to third embodiment, the following components can further be added.

A molar ratio Si/Al between Si and Al of the two-component mixture can be adjusted to 1 or more. Specifically, if the Si/Al molar ratio between Si and Al in the underlying layer formed by using the two-component underlying layer solution composed of the Si-based compound and the Al-based compound is adjusted to 1 or more, the resulting underlying layer is higher in abrasion resistance and heat resistance than an underlying layer composed only of SiO$_2$ and an underlying layer composed only of Al$_2$O$_3$, while it is higher in abrasion resistance and heat resistance than the two-component underlying layer in which the Si/Al molar ratio is less than 1. Since the resistance of the functional film is largely dependent on the resistance of the underlying layer or the like, the arrangement allows the fabrication of a functional film which is high in abrasion resistance and heat resistance.

The compound represented by X—(SiOX$_2$)$_n$—SiX$_3$ can be alkoxysilane. Alkoxysilane is advantageous in that its reaction with moisture and polymerization reaction are easily controlled with a temperature and it is easy to handle because a toxic product such as a hydrochloric acid is not produced during the reaction with moisture. Therefore, the arrangement allows the formation of a high-quality underlying layer having high manufacturing operability and numerous chemical adsorption portions. Moreover, the underlying layer can be fixed securely to the base material by sintering performed at the final stage of fabrication. This allows the fabrication of a functional film with excellent water repellency and high resistance.

The drying in the underlying-layer forming step includes evaporating a solvent contained in the underlying layer solution. The drying in the underlying-layer forming step can be performed at a temperature less than 300° C. If the drying of the underlying layer is performed at a temperature less than 300° C., it becomes possible to cause Al—X' or Si—X exposed at the surface of the underlying layer to react appropriately with moisture to provide Al—OH and Si—OH, while hydroxyl groups (OH) are not lost by a preferred in terms of its excellent water repellency and anti-contamination property. Moreover, the thin film excellent in water repellency prevents the ingress of water between the underlying layer and the base material, which further increases resistance.

A non-aqueous solvent can be used as a solvent of the thin-film forming solution. In the arrangement using the non-aqueous solvent, the trichlorosilane-based compound is prevented from being dehydrated by the solvent and losing the reactivity, so that the silane-based compound is chemically adsorbed efficiently to the portions of hydrophilic groups at the surface of the underlying layer. This allows the formation of the functional film fixed securely to the underlying layer.

The non-aqueous solvent can be silicone. Silicone contains a reduced amount of water and is less likely to absorb water, while it solvates with the chlorosilane-based compound to prevent direct contact between the chlorosilane-based compound and moisture. Therefore, the solution composed of the chlorosilane-based compound and silicone allows chemical adsorption of the chlorosilane-based useless decomposition reaction. In the arrangement, therefore, the density of active hydrogens at the surface of the base material is increased remarkably so that the molecules of the silane-based compound are adsorbed chemically at a high density in the thin-film forming step.

The sintering step includes causing polymerization and setting of constituent molecules of the underlying layer. The sintering in the sintering step can be performed at a temperature more than 300° C. If the sintering temperature is 300° C. or more, the polymerization reaction between the unreacted molecules contained in the underlying layer is promoted sufficiently. Therefore, the arrangement increases the hardness of the underlying layer and allows the underlying layer to be strongly fixed to the base material. As a result, there can be formed a functional film with excellent adhesion and high resistance.

A trichlorosilane-based compound can be used as the silane-based compound for forming the thin film. Since the trichlorosilane-based compound is highly reactive with OH groups, if it is brought into contact with the substrate in an anhydrous atmosphere, it is chemically bonded only to the OH groups at the surface of the underlying layer. This obviates the necessity to use an acid, an alkali, water, or the like during for the formation of a thin film so that the polymerization reaction of the trichlorosilane-based compound does not occur. That is, if the thin-film forming component is a trichlorosilane-based compound, there is no case where functional groups to be bonded to the OH groups at the surface of the underlying layer are lost due to the polymerization reaction, so that the thin-film forming material is surely bonded to the OH groups at the surface of the underlying layer having the thin-film forming material at a high density. As a result, there can be fabricated a functional film with excellent water repellency and high resistance.

A silane-based compound having an alkyl group or a fluoroalkyl group can be used as the silane-based compound for forming the thin film. A thin film composed of a silane-based compound containing an alkyl group or a fluoroalkyl group as a main component is compound to the hydrophilic portions (OH groups) of the underlying layer, while preventing an adverse effect resulting from water in an ambient atmosphere while it is brought into contact with the underlying layer.

The thin-film forming solution is preferably brought into contact with the surface of the base material in an atmosphere at a relative humidity of 35% or less. In the arrangement in which the solution containing the trichlorosilane compound is brought into contact with the underlying layer in an atmosphere having a relative humidity held at 35% or less, an adverse effect (reaction between water and trichlorosilane compound) resulting from water in the atmosphere can be suppressed substantially.

The method may further comprises: a cleaning step of removing unadsorbed molecules of the silane-based compound after the sintering step. This allows the formation of a uniform single molecular film composed of the silane-based compound chemically adsorbed onto the substrate and provides a functional film with a uniform alignment property.

A non-aqueous solvent can be used as a cleaning agent in the cleaning step. This removes the unreacted silane-based compound without allowing it to react with water.

Chloroform can be used as the non-aqueous solvent. Chloroform is preferred because of its low boiling point and excellent drying property after cleaning.

Alternatively, N-methyl-2-pyrrolidinone can be used as the non-aqueous solvent. N-methyl-2-pyrrolidinone has high removability so that, if a chlorosilane compound is used as the silane-based compound, e.g., N-methyl2pyrrolidinone dissolves a chlorosilane polymer resulting from the reaction between chlorosilane and water in the thin-film forming step or sintering step.

A liquid crystal display device of the present invention has the following structure.

(7) A liquid crystal display device according to a fourth embodiment of the present invention comprises: a pair of substrates having a liquid crystal alignment film internally of at least one of the pair of substrates; and a liquid crystal layer provided between the pair of substrates and having a given alignment structure due to the liquid crystal alignment film, the liquid crystal alignment film having: an underlying layer formed on a surface of a base material and composed of a hydrolyzable compound represented by

$X-(SiOX_2)_n-SiX_3$ (where X is at least one functional group selected from the group consisting of a halogen, an alkoxy group, and an isocyanate group and n is an integer equal to or more than 0); and a thin film provided on the underlying layer and composed of a group of molecules of a silane-based compound chemically adsorbed to a surface of the underlying layer, constituent molecules composing the underlying layer being fixed by chemical bonding to the surface of the base material and to the molecules of the silane-based compound, of portions of active hydrogens of the constituent molecules, those ones remaining without being chemically bonded to the molecules of the silane-based compound being chemically bonded to each other such that the constituent molecules are bonded fixedly to each other to have a structural unit represented by the following structural formula (1)

(1)

(where n is an integer equal to or more than 0).

In the arrangement, the molecules of the silane-based compound are uniformly and fixedly bonded at a high density to the substrate via the underlying layer fixed strongly to the substrate. Since the liquid crystal alignment film is thus provided on the substrate, it has high resistance or the like.

The arrangement provides an ultra-thin liquid crystal alignment film and implements a liquid crystal display device with excellent electrooptic characteristics.

(8) A liquid crystal display device according to a fifth embodiment of the present invention comprises: a pair of substrates having a liquid crystal alignment film internally of at least one of the pair of substrates; a liquid crystal layer provided between the pair of substrates and having a given alignment structure due to the liquid crystal alignment film, the liquid crystal alignment film having: an underlying layer formed on a surface of a base material and composed of a hydrolyzable compound represented by

$X'-(AlOX')_n-AlX'_2$ (where X' is an alkoxy group and n is an integer equal to or more than 0), the underlying layer being bonded fixedly onto the base material via an —O—Al bond and having a structural unit represented by the following structural formula (2); and a thin film composed of a group of molecules of a silane-based compound each chemically bonded to a surface of the underlying layer via an —O—Si bond

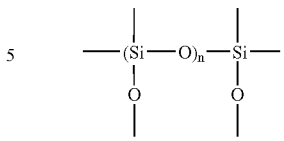

(1)

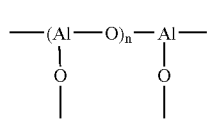

(2)

(where n is an integer equal to or more than 0).

In the arrangement, the underlying layer fixed to the substrate has been formed with the constituent molecules thereof polymerized and set to be bonded and fixed more strongly to the substrate so that it has excellent abrasion resistance and high heat resistance. Accordingly, the liquid crystal alignment film formed on the underlying layer has excellent abrasion resistance and high heat resistance.

In the conventional liquid crystal display device comprising an alignment film composed of, e.g., a polyimide resin or the like, an image sticking phenomenon has been visually recognized as a result of charge accumulation caused by spontaneous polarization in the alignment film when an electric field is applied to the liquid crystal layer. However, since the liquid crystal alignment film according to the present invention is composed of the group of molecules of the silane-based compound chemically adsorbed to the underlying layer, as in the foregoing arrangement, it can be formed as an ultra-thin film. Accordingly, the charge accumulated by spontaneous polarization is extremely small compared with the charge accumulated in the conventional alignment film. This reduces the occurrence of image sticking and implements a liquid crystal display device with excellent electrooptic properties.

(9) A liquid crystal display device according to a sixth embodiment of the present invention comprises: a pair of substrates having a liquid crystal alignment film internally of at least one of the pair of substrates; a liquid crystal layer provided between the pair of substrates and having a given alignment structure due to the liquid crystal alignment film, the liquid crystal alignment film having: an underlying layer formed on a surface of a base material and composed of a hydrolyzable compound represented by

(where X is at least one functional group selected from the group consisting of a halogen, an alkoxy group, and an isocyanate group and n is an integer equal to or more than 0) and a hydrolyzable compound represented by

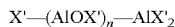

(where X' is an alkoxy group and n is an integer equal to or more than 0), the underlying layer being bonded fixedly onto the base material via a siloxane bond and an —O—Al bond and having structural units represented by the following structural formulae (1) and (2), respectively; the liquid crystal alignment film being and a thin film composed of a group of molecules of a silane-based compound each chemically bonded to a surface of the underlying layer via an —O—Si bond (where n is an integer equal to or more than 0).

The arrangement suppresses the occurrence of image sticking and implements a liquid crystal alignment film with excellent electrooptic properties.

To the liquid crystal display devices according to the fourth to sixth embodiments, the following components can be added.

The group of the molecules of the silane-based compound composing the liquid crystal alignment film can be aligned in a given direction or in a plurality of directions to form a pattern.

Each of the molecules of the silane-based compound has a straight carbon chain having a photosensitive group and the photosensitive group can be polymerized fixedly in a desired direction.

The liquid crystal layer can have a pretilt alignment. Alternatively, the liquid crystal layer can have a homogeneous alignment. Alternatively, the liquid crystal layer can have a homeo tropic alignment.

The liquid crystal display device can be a liquid crystal display device of inplane switching type, wherein the electrodes opposed to each other are formed on a surface of one of the substrates. This provides a liquid crystal display device with excellent electrooptic properties in which image sticking is suppressed in an inplane switching mode.

As the methods of fabricating the foregoing liquid crystal display devices, the following embodiments (10) to (12) can be adopted. The embodiments (10) to (12) are fabrication methods corresponding to the fourth to sixth embodiments described above.

(10) A method of fabricating a liquid crystal display device corresponding to the fourth embodiment comprises: a pair of substrates having a liquid crystal alignment film internally of at least one of the pair of substrates; a liquid crystal layer provided between the pair of substrates and having a given alignment structure due to the liquid crystal alignment film, the method comprising: an underlying-layer forming step of forming an underlying layer composed of a group of constituent molecules having a plurality of portions of active hydrogens and independent of each other by bringing, into contact with a surface of each of the substrates, an underlying layer solution containing a hydrolyzable compound represented by X—(SiOX$_2$)$_n$—SiX$_3$ (where X is at least one functional group selected from the group consisting of a halogen, an alkoxy group, and an isocyanate group and n is an integer equal to or more than 0) and drying the underlying layer solution; a thin-film forming step of forming a thin film composed of a group of molecules of a silane-based compound on a surface of the underlying layer by bringing a solution containing the silane-based compound into contact with the surface of the base material to cause chemical adsorption of each of molecules of the silane-based compound to at least one of the portions of active hydrogens in the constituent molecules and thereby forming the liquid crystal alignment film composed of the underlying layer and the thin film; a sintering step of sintering the base material after the thin-film forming step to cause, of the portions of active hydrogens in the constituent molecules, those ones remaining without chemically adsorbing the molecules of the silane-based compound to be bonded to each other and to the portions of active hydrogens present at the surface of the base material; and an alignment treatment step of performing an alignment treatment with respect to the liquid crystal alignment film.

(11) A method of fabricating a liquid crystal display device corresponding to the fifth embodiment comprises: a pair of substrates having a liquid crystal alignment film internally of at least one of the pair of substrates; a liquid crystal layer provided between the pair of substrates and having a given alignment structure due to the liquid crystal alignment film, the method comprising: an underlying-layer forming step of forming an underlying layer by bringing, into contact with a top surface of each of the substrates, an underlying layer solution containing a hydrolyzable compound represented by X'—(AlOX')$_n$—AlX'$_2$

(where X' is an alkoxy group and n is an integer equal to or more than 0) and drying the underlying layer solution; a thin-film forming step of forming a thin film by bringing a solution containing the silane-based compound into contact with the surface of the substrate formed with the underlying layer to cause chemical adsorption of each of molecules of the silane-based compound to the surface of the substrate and thereby forming the liquid crystal alignment film composed of the underlying layer and the thin film; a sintering step of sintering the substrate; and an alignment treatment step of performing an alignment treatment with respect to the liquid crystal alignment film.

(12) The method of fabricating a liquid crystal display device corresponding to the sixth embodiment comprises: a pair of substrates having a liquid crystal alignment film internally of at least one of the pair of substrates; and a liquid crystal layer provided between the pair of substrates and having a given alignment structure due to the liquid crystal alignment film, the method comprising: an underlying-layer forming step of forming an underlying layer by bringing, into contact with a top surface of each of the substrates, an underlying layer solution containing a two-component mixture composed of a hydrolyzable compound represented by X—(SiOX$_2$)$_n$—SiX$_3$

(where X is at least one functional group selected from the group consisting of a halogen, an alkoxy group, and an isocyanate group and n is an integer equal to or more than 0) and a hydrolyzable compound represented by X'—(AlOX')$_n$—AlX'$_2$

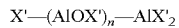

(where X' is an alkoxy group and n is an integer equal to or more than 0) and drying the underlying layer solution; a thin-film forming step of forming a thin film by bringing a solution containing the silane-based compound into contact with the surface of the substrate formed with the underlying layer to cause chemical adsorption of each of molecules of the silane-based compound to the surface of the substrate and thereby forming the liquid crystal alignment film composed of the underlying layer and the thin film; a sintering step of sintering the substrate; and an alignment treatment step of performing an alignment treatment with respect to the liquid crystal alignment film.

To the methods of fabricating the liquid crystal display devices according to the fourth to sixth embodiments, the following components can further be added.

The method can further comprise a cleaning step of removing unadsorbed molecules of the silane-based compound after the sintering step.

The method can further comprise, after the cleaning step, a drainage alignment step of draining the cleaning agent in a desired direction of drainage and thereby aligning the molecules of the silane-based compound composing the liquid crystal alignment film in the direction of drainage. This allows the formation of the liquid crystal alignment film composed of the group of molecules of the silane-based compound which are aligned in the direction of drainage. When an alignment treatment is performed after the drainage alignment step, conditions for the alignment treatment can be made less strict in such a manner that, e.g., the dose of UV light is reduced in the light alignment method or the number of treatments is reduced in the rubbing treatment method.

The alignment treatment step can be a rubbing alignment step of aligning the molecules of the silane-based compound in the liquid crystal alignment film in a desired direction by a rubbing treatment. This renders the rubbing conditions less strict and allows the fabrication of a chemically adsorbed film aligned in the rubbing direction in accordance with the rubbing method, while preventing the film from being scraped.

If the thin film in the liquid crystal alignment film is composed of the group of molecules of the silane-based compound each having a photosensitive group, the alignment treatment step can be a polarized-light alignment step of irradiating the surface of the substrate formed with the liquid crystal alignment film with polarized light to cause a crosslinking reaction between the molecules of the silane-based compound and thereby exerting an alignment regulating force which enables liquid crystal molecules to be aligned in a specified direction. The drainage alignment step or the rubbing alignment step each for aligning the chemically adsorbed film having the photosensitive groups allows easy occurrence of an anisotropic light reaction which aligns the photosensitive groups in a desired direction and reduces the dose of the polarized UV light than in the conventional light alignment method (polarized light alignment step). In addition, the alignment treatment can be performed without performing a rubbing treatment which causes static electricity. As a result, there can be provided a liquid crystal display device with excellent electrooptic properties in which the occurrence of image sticking or the like is suppressed.

An intensity of the polarized light used for irradiation in the polarized-light alignment step can be 1 J/cm$^2$ or more at a wavelength of 365 nm. This allows the liquid crystal layer to have the homogeneous alignment, which can be applied suitably to a liquid crystal display device in the in-plane switching mode.

A 5 mol % or less of silane-based compound having a fluoroalkyl group can be mixed in the solution containing the silane-based compound. This allows the liquid crystal layer to have the homeotropic alignment.

These and other objects, features, and advantages of the present invention will be fully understood from the following description. The advantages of the present invention will become obvious in the following description given with reference to the accompanying drawings.

BEST MODE FOR CARRYING OUT THE INVENTION

Embodiments

Figure 1:
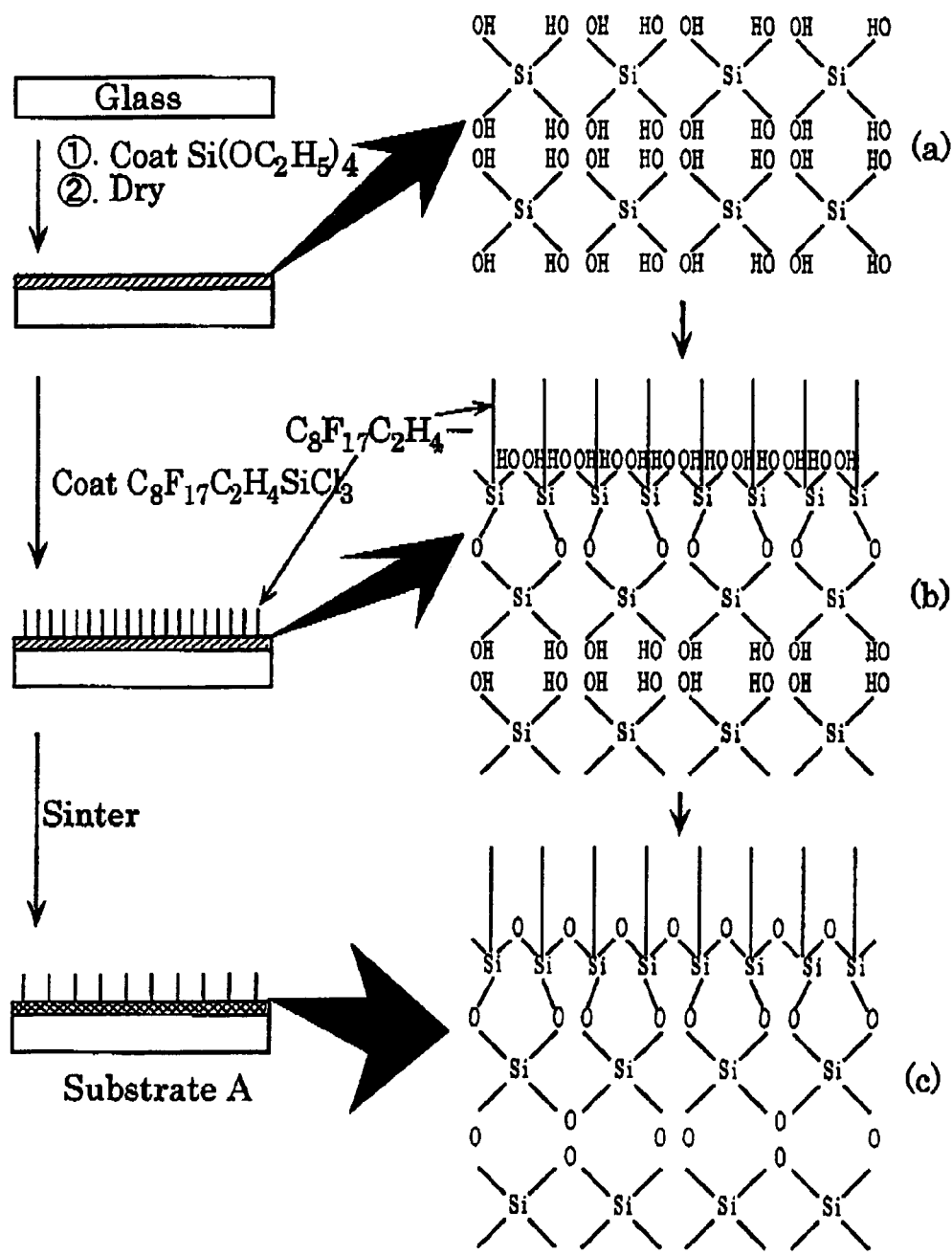
FIG. 1 are conceptual views for illustrating a method of fabricating a functional film according to the present invention.

In accordance with a method of fabricating a functional film of the present invention, an underlying layer is formed on a substrate made of, e.g., glass by coating a surface of the glass substrate with an underlying layer solution prepared by using:

(1) a hydrolyzable compound represented by

(where X is at least one functional group selected from the group consisting of a halogen, an alkoxy group, and an isocyanate group and n is an integer equal to or more than 0);

(2) a hydrolyzable compound (hereinafter referred to as an underlying layer forming material) represented by

(where X' is an alkoxy group and n is an integer equal to or more than 0); or (3) a mixture of a hydrolyzable compound represented by

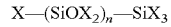

(where X is at least one functional group selected from the group consisting of a halogen, an alkoxy group, and an isocyanate group and n is an integer equal to or more than 0) and a hydrolyzable compound represented by

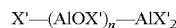

(where X' is an alkoxy group and n is an integer equal to or more than 0) and drying the solvent.

Then, a solution containing a silane-based compound is coated on the underlying layer and the solvent is dried. This causes chemical adsorption of the molecules of the silane-based compound to a surface of the underlying layer. Thereafter, the base material made of glass is sintered such that the underlying layer is securely fixed to the substrate.

The fabrication method allows the molecules of the silane-based compound to be bonded to the underlying layer strongly and uniformly and allows the underlying layer to be strongly fixed to the base material by sintering performed at the final stage of fabrication. As a result, the functional film entirely bonded and fixed to the glass substrate solidly and uniformly can be fabricated. Such a functional film functions properly as a surface-property modifying coating over a long period of time. By contrast, the conventional fabrication method which performs sintering during the formation of the underlying layer cannot surely provide sufficient adsorbing portions (OH groups) of the silane-based compound since the surface of the underlying layer loses the hydroxyl groups due to the temperature during sintering. Accordingly, the functional film fabricated by the conventional method is inferior to the functional film fabricated by the method of the present invention in terms of adhesion, uniformity, and resistance.

In the fabrication method of the present invention, drying during the formation of the underlying layer is performed desirably at a temperature less than 300° C., preferably at temperatures of 50° C. to 200° C., and more preferably at temperatures of 80° C. to 150° C. If the drying temperature is adjusted to 300° C. or more, X'—(AlOX')$_n$—AlX'$_2$ as the component of the underlying layer polymerizes or X'—(AlOX')$_n$—AlX'$_2$ and X—(SiOX$_2$)$_n$—SiX$_3$ as the components of the underlying layer polymerize so that the surface of the underlying layer loses active hydrogens. If consideration is given to both drying efficiency and the polymerization of the underlying layer forming material, temperatures of 50° C. to 200° C. are preferable and temperatures 80° C. to 150° C. are recommended as more preferable drying temperatures. If the temperature is in the range of 80 to 150° C., Al—X' at the surface of the underlying layer or Al—X' and Si—X in the two-component system react appropriately with moisture so that active hydrogens at the surface of the underlying layer increase, while excessive decomposition is suppressed.

On the other hand, sintering in the sintering step performed at the final stage of fabrication is performed desirably at a temperature of 300° C. or more, preferably at temperatures of 300° C. to 500° C., and more preferably at temperatures of 400° C. to 500° C. If the temperature is less than 300° C., the polymerization reaction of X'—(AlOX')$_n$—AlX'$_2$ as the component of the underlying layer or the polymerization reaction of X'—(AlOX')$_n$—AlX'$_2$ and X—(SiOX$_2$)$_n$—SiX$_3$ does not proceed satisfactorily so that the resulting underlying layer has low hardness and a week bonding force relative to the base material. If the sintering temperature is adjusted to 500° C. or more, on the other hand, the underlying layer forming material or the silane-based compound as the component of the thin film may be decomposed. If consideration is given to both sintering efficiency and decomposition, therefore, sintering is performed desirably at temperatures of 400° C. to 500° C.

The foregoing solution containing the silane-based compound indicates a solution containing a silane-based compound dissolved in a solvent. However, part of the silane-based compound may be in an undissolved state. As a typical example of the solution, a solution in a supersaturated state may be listed.

In the fabrication method of the present invention, the compounds represented by the following general formulae may be listed as examples of the compound represented by X—(SiOX$_2$)$_n$—SiX$_3$ (where X is at least one functional group selected from the group consisting of a halogen, an alkoxy group, and an isocyanate group and n is an integer equal to or more than 0).

Of the following compounds, alkoxysilane is particularly preferred for the reasons that a reaction of alkoxysilane with moisture and a polymerization reaction of alkoxysilane can be controlled easily with a temperature, alkoxysilane is easy to handle because it does not generate a toxic product such as a hydrochloric acid upon reaction with moisture, and the like.

$$SiX_4 \text{ (corresponding to n=0)} \tag{1}$$

$$SiX_3\text{—O—}SiX_3 \text{ (corresponding to n=1)} \tag{2}$$

More specific compounds are:

$$Si(OC_2H_5)_4 \tag{3}$$

$$Si(OCH_3)_3\text{—O—}Si(OCH_3)_3 \tag{4}$$

$$Si(OC_2H_5)_3\text{—O—}Si(OCH_3)_3 \tag{5}$$

$$Si(OC_2H_5)_3\text{—O—}Si(OC_2H_5)_3 \tag{6}$$

$$Si(NCO)_4 \tag{7}$$

$$Si(NCO)_3\text{—O—}Si(NCO)_3 \tag{8}$$

$$SiCl_4 \tag{9}$$

$$SiCl_3\text{—O—}SiCl_3 \tag{10}$$

$$Si(OCH_3)_3\text{—O—}Si(OC_2H_5)_3 \tag{11}$$

In the fabrication method of the present invention, the compounds represented by the following general formulae may be listed as examples of the compound represented by X'—(AlOX')$_n$—AlX'$_2$ (where X' is an alkoxy group and n is an integer equal to or more than 0).

$$AlX'_3 \text{ (corresponding to n=0)} \tag{12}$$

$$AlX'_2\text{—O—}AlX'_2 \text{ (corresponding to n=1)} \tag{13}$$

More specific compounds are:

$$Al(OC_2H_5)_3 \tag{14}$$

$$Al(OCH_3)_2\text{—O—}Al(OCH_3)_2 \tag{15}$$

$$Al(OCH_3)_2\text{—O—}Al(OC_2H_5)_2 \tag{16}$$

On the other hand, the following compounds can be shown as examples of the silane-based compound that can be used in the present invention:

$$SiY_pCl_{3-p} \tag{17}$$

$$CH_3(CH_2)_sO(CH_2)_tSiY_qCl_{3-q} \tag{18}$$

$$CH_3(CH_2)_u\text{·}Si(CH_3)_2(CH_2)_v\text{—}SiY_qCl_{3-q} \tag{19}$$

$$CF_3COO(CH_2)_wSiY_qCl_{3-q} \tag{20}$$

$$CH_3\text{—}(CH_2)_rSiY_qCl_{3-q} \tag{21}$$

where p is an integer of 0 to 3, q is an integer of 0 to 2, r is an integer of 1 to 25, s is an integer of 0 to 12, t is an integer of 1 to 20, u is an integer of 0 to 12, v is an integer of 1 to 20, and w is an integer of 1 to 25, Y is a hydrogen, an alkyl group, an alkoxyl group, a fluorine-containing alkyl group, or a fluorine-containing alkoxy group.

The following compositions (22) to (34) can be shown as specific examples of the trichlorosilane-based compound:

$$CH_3CH_2O(CH_2)_{15}SiCl_3 \tag{22}$$

$$CH_3(CH_2)_2Si(CH_3)_2(CH_2)_{15}SiCl_3 \tag{23}$$

$$CH_3(CH_2)_6Si(CH_3)_2(CH_2)_9SiCl_3 \tag{24}$$

$$CH_3COO(CH_2)_{15}SiCl_3 \tag{25}$$

$$CF_3(CF_2)_7\text{—}(CH_2)_2\text{—}SiCl_3 \tag{26}$$

$$CF_3(CF_2)_5\text{—}(CH_2)_2\text{—}SiCl_3 \tag{27}$$

$$CF_3(CF_2)_7\text{—}C_6H_4\text{—}SiCl_3 \tag{28}$$

$$CF_3(CH_2)_9SiCl_3 \tag{29}$$

$$CH_3(CH_2)_9OSiCl_3 \tag{30}$$

$$CH_3(CH_2)_9Si(CH_3)_2(CH_2)_{10}SiCl_3 \tag{31}$$

$$C_6H_5\text{—}CH\text{=}CH\text{—}CO\text{—}O\text{—}(CH_2)_6\text{—}O\text{—}SiCl_3 \tag{32}$$

$$C_6H_5\text{—}CO\text{—}CH\text{=}CH\text{—}C_6H_4\text{—}O\text{—}(CH_2)_6\text{—}O\text{—}SiCl_3 \tag{33}$$

$$C_6H_5\text{—}CH\text{=}CH\text{—}CO\text{—}C_6H_4\text{—}O\text{—}(CH_2)_6\text{—}O\text{—}SiCl_3 \tag{34}$$

The compound (32) has a cinnamoyl group as a photosensitive group and each of the compounds (33) and (34) has a chalconyl group as a photosensitive group so that the portions of the photosensitive groups are polymerized with the irradiation of UV light.

In place of the chlorosilane-based compound, there can also be used silane-based compounds each containing isocyanate as a main component, which are represented by the following general formulae (35) to (39) in each of which a chlorosilyl group is replaced with an isocyanate group:

$$SiY_p(NCO)_{4-p} \tag{35}$$

$$CH_3\text{—}(CH_2)_rSiY_q(NCO)_{3-q} \tag{36}$$

$$CH_3(CH_2)_sO(CH_2)_tSiY_q(NCO)_{3-q} \tag{37}$$

CH₃(CH₂)ᵤ—Si(CH₃)₂(CH₂)ᵥ—SiY_q(NCO)_{3-q}    (38)

CF₃COO(CH₂)ᵥSiY_q(NCO)_{3-q}    (39)

where each of p, q, r, s, t, u, v, and w is the same as described above.

The following compounds (40) to (47) can be shown as specific examples of the silane-based compound each containing isocyanate as a main component:

CH₃CH₂O(CH₂)₁₅Si(NCO)₃    (40)

CH₃(CH₂)₂Si(CH₃)₂(CH₂)₁₅Si(NCO)₃    (41)

CH₃(CH₂)₆Si(CH₃)₂(CH₂)₉Si(NCO)₃    (42)

CH₃COO(CH₂)₁₅Si(NCO)₃    (43)

CH₃(CH₂)₉Si(OC₂H₅)₃    (44)

CF₃(CF₂)₇—(CH₂)₂—Si(NCO)₃    (45)

CF₃(CF₂)₅—(CH₂)₂—Si(NCO)₃    (46)

CF₃(CF₂)₇—C₆H₄—Si(NCO)₃    (47)

In the present invention, there can also be used silane-based compounds each containing alkoxy as a main component, each of which is represented by the general formula:

SiY_k(OA)_{4-k}

(where Y is the same as described above, A is an alkyl group, and k is 0, 1, 2, or 3). Of the silane-based compounds each containing alkoxy as a main component, those represented by:

CF₃—(CF₂)ₙ—(R)ₗ—SiY_p(OA)_{3-p}

(where n is an integer equal to or more than 1, preferably an integer of 1 to 22, R is an alkyl group, a vinyl group, an ethinyl group, an aryl group, or a substituent group containing a silicon or oxygen atom, l is 0 or 1, and each of Y, A, and p is the same as described above) are superior in terms of increasing the anti-contamination property.

However, the silane-based compounds each containing alkoxy as a main component which are usable in the present invention are not limited to the foregoing. There can also be used other silane-based compounds each containing alkoxy as a main component, which are represented by, e.g., the following general formulae:

CH₃—(CH₂)ᵣ—SiY_q(OA)_{3-q}

CH₃—(CH₂)ₛ—O—(CH₂)ₜ—SiY_q(OA)_{3-q}

CH₃—(CH₂)ᵤ—Si(CH₃)₂—(CH₂)ᵥ—SiY_q(OA)_{3-q}

CF₃COO—(CH₂)ᵥ—SiY_q(OA)_{3-q}

(where each of p, q, r, s, t, u, v, w, Y, and A is the same as described above).

The following compounds (47) to (71) can be listed as specific examples of the silane-based compounds each containing alkoxy as a main component:

CH₃CH₂O(CH₂)₁₅Si(OCH₃)₃    (47)

CF₃CH₂O(CH₂)₁₅Si(OCH₃)₃    (48)

CH₃(CH₂)₂Si(CH₃)₂(CH₂)₁₅Si(OCH₃)₃    (49)

CH₃(CH₂)₆Si(CH₃)₂(CH₂)₉Si(OCH₃)₃    (50)

CH₃(CH₂)₉Si(NCO)₃    (51)

CH₃COO(CH₂)₁₅Si(OCH₃)₃    (52)

CF₃(CF₂)₅(CH₂)₂Si(OCH₃)₃    (53)

CF₃(CF₂)₇—C₆H₄—Si(OCH₃)₃    (54)

CH₃CH₂O(CH₂)₁₅Si(OC₂H₅)₃    (55)

CH₃(CH₂)₂Si(CH₃)₂(CH₂)₁₅Si(OC₂H₅)₃    (56)

CH₃(CH₂)₆Si(CH₃)₂(CH₂)₉Si(OC₂H₅)₃    (57)

CF₃(CH₂)ₙSi(CH₃)₂(CH₂)₉Si(OC₂H₅)₃    (58)

CH₃COO(CH₂)₁₅Si(OC₂H₅)₃    (59)

CF₃COO(CH₂)₁₅Si(OC₂H₅)₃    (60)

CF₃COO(CH₂)₁₅Si(OCH₃)₃    (61)

CF₃(CF₂)(CH₂)₂Si(OC₂H₅)₃    (62)

CF₃(CF₂)₇(CH₂)₂Si(OC₂H₅)₃    (63)

CF₃(CF₂)₅(CH₂)₂Si(OC₂H₅)₃    (64)

CF₃(CF₂)₇C₆H₄Si(OC₂H₅)₃    (65)

CF₃(CF₂)₉(CH₂)₂Si(OCH₃)₃    (66)

CF₃(CF₂)₅(CH₂)₂Si(OCH₃)₃    (67)

CF₃(CF₂)₇(CH₂)₂SiCH₃(OC₂H₅)₂    (68)

CF₃(CF₂)₇(CH₂)₂SiCH₃(OCH₃)₂    (69)

CF₃(CF₂)₇(CH₂Si(CH₃)₂OC₂H₅    (70)

CF₃(CF)₇(CH₂)₂Si(CH₃)₂OCH₃    (71)

If the compounds (20) to (71) shown as the examples of the silane-based compounds each containing isocyanate or alkoxy as a main component are used, the advantages are offered that the apparatus suffers no damage and easy operation can be performed since no hydrochloric acid is generated during chemical bonding.

Descriptions will be given next to the process of forming the thin film on the surface of the base material by using the silane-based compound and to the solvent and base material as elements for implementing the present invention.

The following chemical formulae show reactions occurring when CF₃—(CF₂)₇—(CH₂)₂—SiCl₃ is brought into contact with the substrate made of glass (glass plate). It is assumed that the underlying layer has already been formed on the glass substrate.

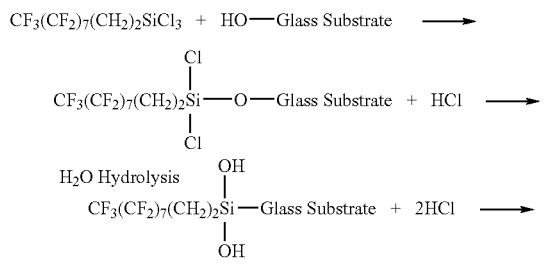

-continued

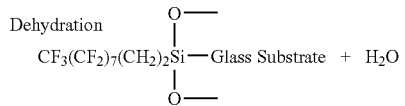

The reaction step (dehydrochlorination reaction) shown in the first chemical reaction formula is a reaction generally termed a chemical adsorptive reaction. When a silane-based compound solution is brought into contact with the base material having OH groups, the dehydrochlorination reaction occurs so that one end of a molecule of the silane-based compound is chemically bonded to the portions of the OH groups. Since the reaction occurs between the SiCl groups of the silane-based compound and the OH groups, the reaction with the base material is inhibited if a large amount of water is contained in the silane-based compound solution. To cause the reaction to proceed smoothly, a non-aqueous solvent not containing active hydrogens such as OH groups is used preferably and the reaction preferably proceeds in an atmosphere low in humidity. Humidity conditions will be described in detail in the experimental section described below.

As examples of the solvent for the silane-based compound which can be used properly in the present invention, there can be listed a hydrocarbon-based solvent, a fluorocarbon-based solvent, a silicone-based solvent, and the like, each of which does not contain water. As usable examples of a petroleum-based solvent, there can be listed petroleum naphtha, solvent naphtha, petroleum ether, petroleum benzine, isoparaffin, normal paraffin, decalin, industrial gasoline, kerosene, ligroin, dimethyl silicone, phenyl silicone, alkyl denaturated silicone, polyester silicone, and the like. As the fluorocarbon-based solvent, there can be used a fluorocarbon-based solvent, Florinate™ (commercially available from SUMITOMO 3M Co., Ltd.), Aflude™ (commercially available from Asahi Glass, Co., Ltd.), or the like. These solvents may be used either alone or two or more miscible ones of the solvents may be used in combination.

Requirements for the base material to which the present invention is applicable are such that a solution containing a compound represented by the composition formula of X'—(AlOX')$_n$—AlX'$_2$ (where X' is an alkoxy group and n is an integer equal to or more than 0) or a two-component solution containing a mixture of a compound represented by the composition formula of X—(SiOX$_2$)$_n$—SiX$_3$ (where X is at least one functional group selected from the group consisting of a halogen, an alkoxy group, and an isocyanate group and n is an integer equal to or more than 0) and a compound represented by the composition formula of X'—(AlOX')$_n$—AlX'$_2$ (where X' is an alkoxy group and n is an integer equal to or more than 0) can be coated, added, or attached (generally termed contact) to the based material and that the base material should endure sintering. As examples of the base material which satisfy the requirements, there can be shown glass, ceramics, an aluminum oxide, or metal such as aluminum or stainless steel. It will easily be appreciated that the fabrication method of the present invention is also applicable to a plastic resin having heat resistance.

In the case of coating the functional film of the present invention as a liquid crystal alignment film onto a liquid crystal display device, the functional film can be fabricated in accordance with the following method.

First, the underlying layer is formed on the substrate formed with an electrode composed of an ITO or the like by the same procedure as described above (underlying-layer forming step). Subsequently, the functional film as the liquid crystal alignment film is formed on the underlying layer (thin-film forming step) and then the substrate is sintered (sintering step).

After the sintering step, the substrate formed with the liquid crystal alignment film is cleaned with a cleaning agent (cleaning step) such that the unreacted silane-based compound is removed. As examples of the cleaning agent, there can be listed a hydrocarbon-based solvent, a fluorocarbon-based solvent, a silicone-based solvent, and the like, each of which does not contain water. As usable examples of the petroleum-based solvent, there can be listed petroleum naphtha, solvent naphtha, petroleum ether, petroleum benzine, isoparaffin, normal paraffin, decalin, industrial gasoline, kerosene, ligroin, dimethyl silicone, phenyl silicone, alkyl denaturated silicone, polyester silicone, and the like. As the fluorocarbon-based solvent, there can be used a fluorocarbon-based solvent, Florinate™ (commercially available from SUMITOMO 3M Co., Ltd.), Aflude™ (commercially available from Asahi Glass, Co., Ltd.), or the like. These solvents may be used either alone or two or more miscible ones of the solvents may be used in combination. Chloroform is particularly preferred because of its excellent drying property after cleaning. On the other hand, N-methyl-2-pyrrolidinone is excellent in the removability of a chlorosilane polymer produced as a result of the reaction between chlorosilane and water in the thin-film forming step or the sintering step.

Subsequently, the cleaning agent is drained after the cleaning step. At this time, the substrate is raised such that the direction of drainage of the cleaning agent is generally coincident with the direction of an alignment treatment performed with respect to the liquid crystal alignment film (drainage alignment direction). This allows film constituent molecules composing the liquid crystal alignment film to be tilted in the direction of drainage and provisionally aligned. The cleaning agent is removed by further drying the substrate.

Then, the liquid crystal alignment film in which the molecules are provisionally aligned in the direction of drainage is subjected to the alignment treatment. If the film constituent molecules composing the liquid crystal alignment film have photosensitive groups, e.g., the alignment treatment is performed by irradiating the liquid crystal alignment film with polarized UV light (polarized-light alignment step). At this time, the direction of drainage has been adjusted to be nearly coincident with the direction of polarization of the polarized UV light. As a result, the photopolymerization reaction between the photosensitive groups causes crosslinking along the direction of polarization and fixes the alignment of the film constituent molecules. As examples of the photosensitive groups, there can be shown a cinnamoyl group shown in the following chemical formula (5), a chalconyl group shown in the following chemical formula (6), and the like:

(5)

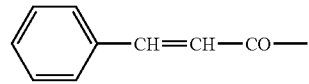

-continued

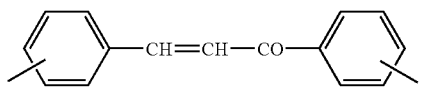
(6)

When the photosensitive groups are irradiated with the polarized UV light, the structure results in which the adjacent film constituent molecules are crosslinked via at least one of the bonds of the C—C double bonded portion in the chemical formulae (5) or (6). If consideration is given to the sensitivity of the chalconyl group to the polarized UV light which is higher than that of the cinnamoyl group to the polarized UV light, the chalconyl group is used preferably as the photosensitive group. This achieves a reduction in the dose of the polarized UV light and a reduction in tact time in the polarized-light alignment step. Preferable conditions for the irradiation with the polarized UV light are such that the wavelengths of the polarized UV light are distributed in the vicinity of 300 to 400 nm and the dose is in the range of about 50 to 2000 mJ/cm$^2$ at a wavelength of 365 nm. In particular, a homogeneous alignment structure is achieved at a dose of 1000 mJ/cm$^2$ or more. On the other hand, a pretilt alignment structure is achieved at a dose less than 100 mJ/cm$^2$.

If the film constituent molecules composing the liquid crystal alignment film contain no photosensitive group, a rubbing treatment is performed instead of implementing a light alignment method. In this case also, the direction of drainage is adjusted to be nearly coincident with the direction of the rubbing treatment. This obviates the necessity for strong rubbing since the film constituent molecules have been preliminarily aligned in the direction of the rubbing treatment. Compared with the conventional rubbing treatment, less strict rubbing conditions are satisfactory. Preferable rubbing conditions in the rubbing treatment are such that the width and depth of a groove portion resulting from rubbing are nearly in the range of 0.01 to 0.5 μm.

The content of the present invention will be described specifically with reference to Examples.

EXAMPLE 1

The present example corresponds to a functional film according to a first embodiment. As a compound represented by X—(SiOX$_2$)$_n$—SiX$_3$ (where X is at least one functional group selected from the group consisting of a halogen, an alkoxy group, and an isocyanate group and n is an integer equal to or more than 0), Si(OC$_2$H$_5$)$_4$ was prepared and an underlying layer solution containing Si(OC$_2$H$_5$)$_4$/HCl/water/isopropylalcohol=1/0.01/5/25 (at a molar ratio) was produced. The underlying layer solution is coated on the surface of a glass plate by immersing the glass plate in the underlying layer solution and raising it at a speed of 1 mm/second and then dried at a temperature of 80° C. for 15 minutes, whereby an unsintered underlying layer composed of Si(OC$_2$H$_5$)$_4$ was formed on the surface of the glass plate.

Then, C$_8$F$_{17}$C$_2$H$_4$SiCl$_3$ was prepared as the silane-based compound and a silane-based compound solution containing C$_8$F$_{17}$C$_2$H$_4$SiCl$_3$/C$_8$F$_{18}$=1/99 (at a volume ratio) was produced. The silane-based compound was coated onto the surface of the glass plate by immersing the glass plate formed with the underlying layer (unsintered) in the silane-based compound solution and raising it at a speed of 1 mm/second in an anhydrous atmosphere at a relative humidity of 5% or less. Thereafter, the solvent (C$_8$F$_{18}$) on the surface of the glass plate was evaporated therefrom and the glass plate was sintered at 400° C. for 15 minutes, whereby a base material A1 having the functional film was fabricated.

FIG. 1 are conceptual views illustrating the flow of the fabrication method. FIG. 1(a) shows the state in which Si(OC$_2$H$_5$)$_4$ as the component of the underlying layer is hydrolyzed when the underlying layer solution is coated on the glass plate and dried so that OH groups have been introduced. FIG. 1(b) shows the state in which the silane-based compound (C$_8$F$_{17}$C$_2$H$_4$SiCl$_3$) is chemically adsorbed to the portions of the OH groups when the silane-based compound solution is coated on the underlying layer. FIG. 1(c) shows the state in which the component of the underlying layer is polymerized by sintering the substrate.

It is assumed herein below that a glass plate formed with a functional film will be referred to as a substrate and a method of performing sintering after the coating of the silane-based compound solution without performing sintering during the formation of the underlying layer will be referred to as a post-sintering method.

COMPARATIVE EXAMPLE 1

A substrate B1 having a functional film was fabricated in the same manner as in Example 1 except that an underlying layer (sintered underlying layer) was formed in accordance with a method of sintering the glass plate coated with the underlying layer solution at 400° C. for 15 minutes, instead of drying it at 80° C. for 15 minutes, and that post-sintering at 400° C. for 15 minutes was not performed with respect to the glass plate coated with the silane-based compound solution.

Figure 2:
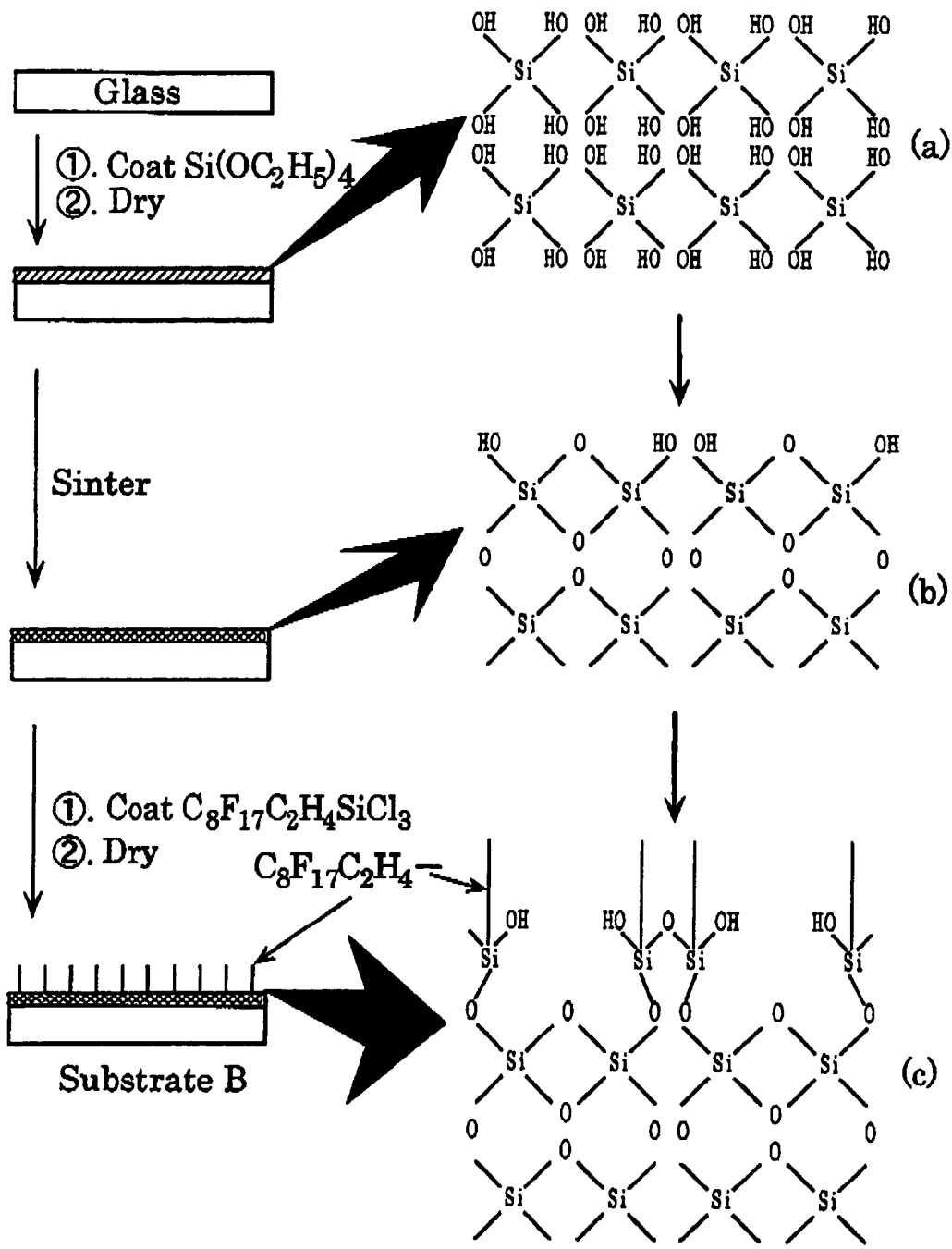
FIG. 2 are conceptual views for illustrating a conventional method of fabricating a functional film.

FIG. 2 are conceptual view of the method. FIG. 2(a) shows the state in which Si(OC$_2$H$_5$)$_4$ as the component of the underlying layer is hydrolyzed when the underlying layer solution is coated on the glass plate and dried so that OH groups have been introduced. FIG. 2(b) shows the state in which the OH groups at the surface of the underlying layer were partly lost as a result of the sintering of the underlying layer. FIG. 2(c) shows the state in which the silane-based compound (C$_8$F$_{17}$C$_2$H$_4$SiCl$_3$) was chemically adsorbed to a reduced number of OH groups.

It is assumed herein below that Comparative Example 1 is a method according to the prior art technology and sintering performed during the formation of the underlying layer in accordance with the method will be referred to as a pre-sintering method.

COMPARATIVE EXAMPLE 2

Figure 3:
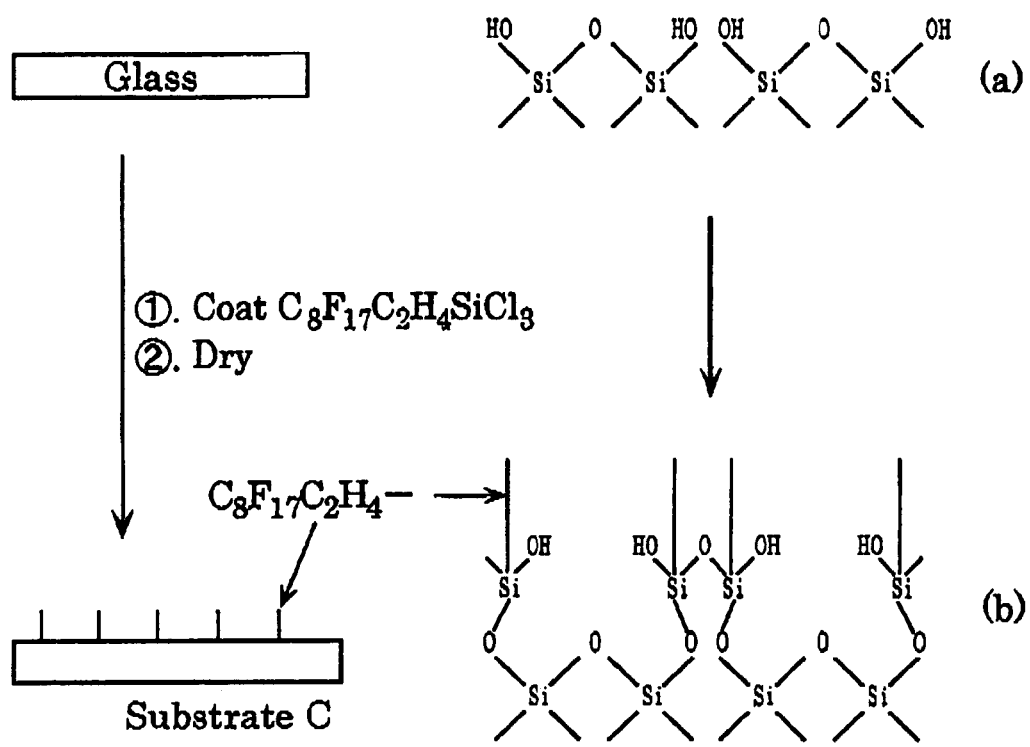
FIG. 3 are conceptual views for illustrating the conventional method of fabricating a functional film in which an underlying layer is not formed.

A substrate C1 having a functional film according to Comparative Example 2 was fabricated by using an unprocessed glass plate having no underlying layer, immersing the glass plate in the silane-based compound solution, raising it at a speed of 1 mm/second, and evaporating C$_8$F$_{18}$. FIG. 3 are conceptual views of the method.

FIG. 3(a) shows OH groups present at the surface of the glass substrate.

FIG. 3(b) shows the state in which the silane-based compound (C$_8$F$_{17}$C$_2$H$_4$SiCl$_3$) was chemically adsorbed to a reduced number of OH groups.

[Conditions for Film Fabrication and Resistances]

Figure 4:
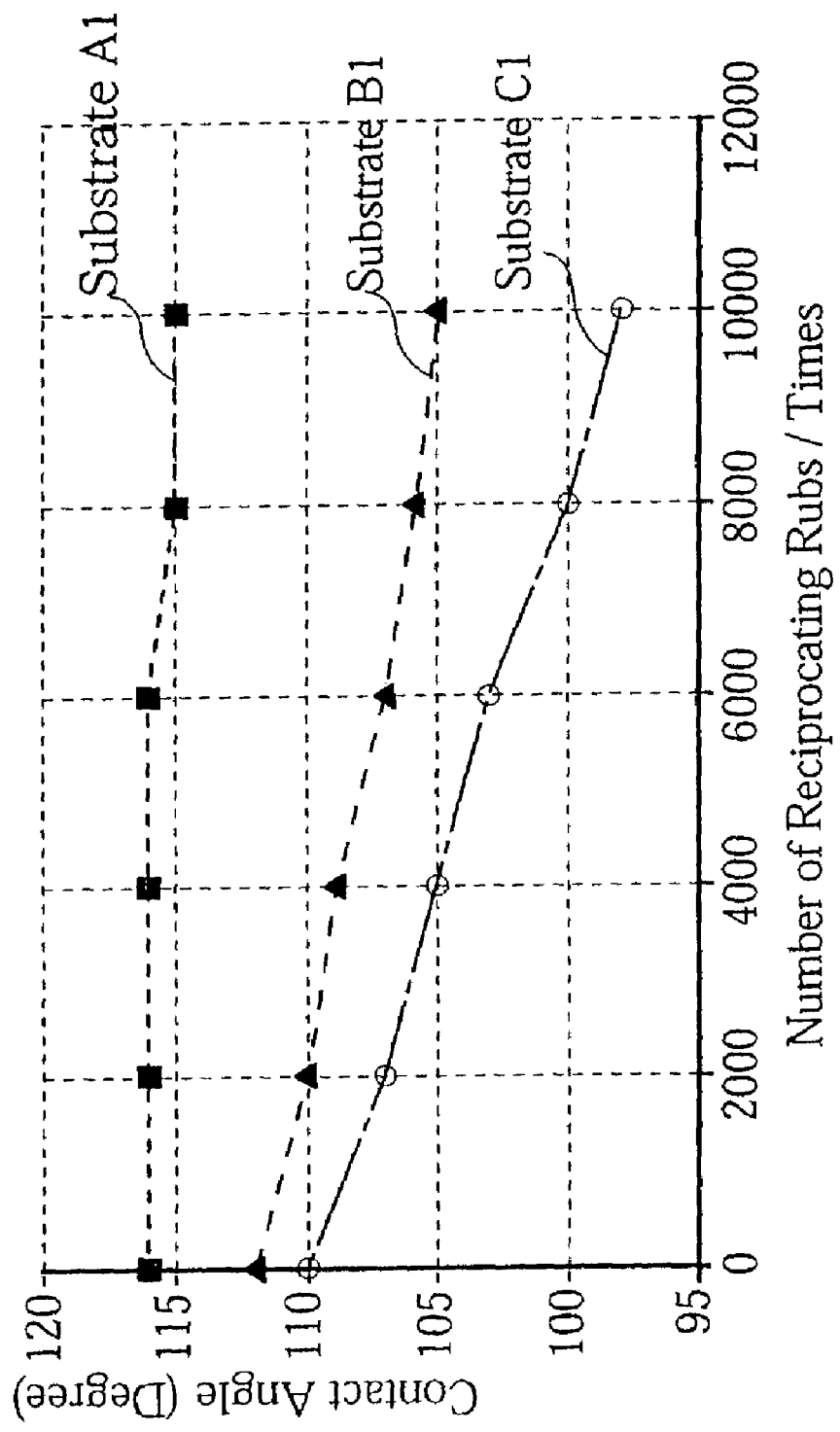
FIG. 4 is a graph showing the relationship between the number of rubs and a contact angle.

The relations among the presence or absence of the underlying layer, different sintering conditions, and contact angles were examined by using the foregoing substrates A1, B1, and C1. The contact angles were measured as follows. Each of the substrates A1 to C1 was rubbed 10000 times by using a sponge for washing dishes with the application of a load of 2 kgf, while contamination on the substrate was removed by ultrasonic cleaning using ethanol every 2000 rubs. Thereafter, 10 µl of water was applied dropwise to the surface of each of the substrates formed with the coating and the contact angle was measured. FIG. 4 shows the results of measurement.

As is obvious from FIG. 4, the substrate A1 (Example 1) fabricated in accordance with the method of the present invention had a large initial contact angle and the lowering of the contact angle was barely recognized even after it was rubbed by using the sponge. By contrast, the substrate B1 (Comparative Example 1) fabricated in accordance with the pre-sintering method had an initial contact angle smaller than that of the substrate A1 and the contact angle had a tendency to significantly lower after it was rubbed by using the sponge. The substrate C1 (Comparative Example 2) having no underlying layer had an initial contact angle smaller than that of the substrate B1 and the contact angle lowered significantly after it was rubbed by using the sponge.

The foregoing results have proved that the functional film with excellent water repellency and high resistance can be formed in accordance with the fabrication method of the present invention.

The foregoing results can be examined as follows. In the substrate A1, the underlying layer was securely fixed to the substrate surface and the molecules of the silane-based compound were chemically bonded uniformly and strongly to the underlying layer to form a thin film of high quality. Therefore, it can be considered that the initial contact angle of the substrate A1 was large and the peeling of the thin film which might have induced the lowering of the contact angle did not occur even after rubbing. It can also be considered that a coating lower in uniformity and bonding strength than that formed on the substrate A1 was formed on the substrate B1 having the pre-sintered underlying layer since the substrate surface had lost hydroxyl groups as a result of sintering. It can also be considered that a non-uniform thin film having the suspended molecules of the silane-based compound which were not bonded directly to the substrate was formed on the substrate C1 having no underlying layer since the substrate C1 had a reduced number of portions of active hydrogens to which the molecules of the silane-based compound were to be bonded. As a result, the substrate C1 had the small initial contact angle and lower resistance to rubbing.

EXAMPLE 2

A substrate D1 according to Example 2 was fabricated in the same manner as in Example 1 described above except that $Si(NCO)_4$ was used in place of $Si(OC_2H_5)$ as a compound represented by $X-(SiOX_2)_n-SiX_3$ (where X is at least one functional group selected from the group consisting of a halogen, an alkoxy group, and an isocyanate group and n is an integer equal to or more than 0).

[Different Components of Underlying Layers and Resistances]

The substrate A1 according to Example 1 and the substrate D1 according to Example 2 were allowed to stand in an atmosphere heated to 300° C. for 100 hours. In the mean time, contamination on each of the substrates was removed by ultrasonic cleaning using ethanol every 20 hours and then the contact angle was measured by applying dropwise 10 µl of water to the surface of each of the substrates formed with a coating. Hereinafter, the method for measurement will be referred to as a heat resistance test method.

Figure 5:
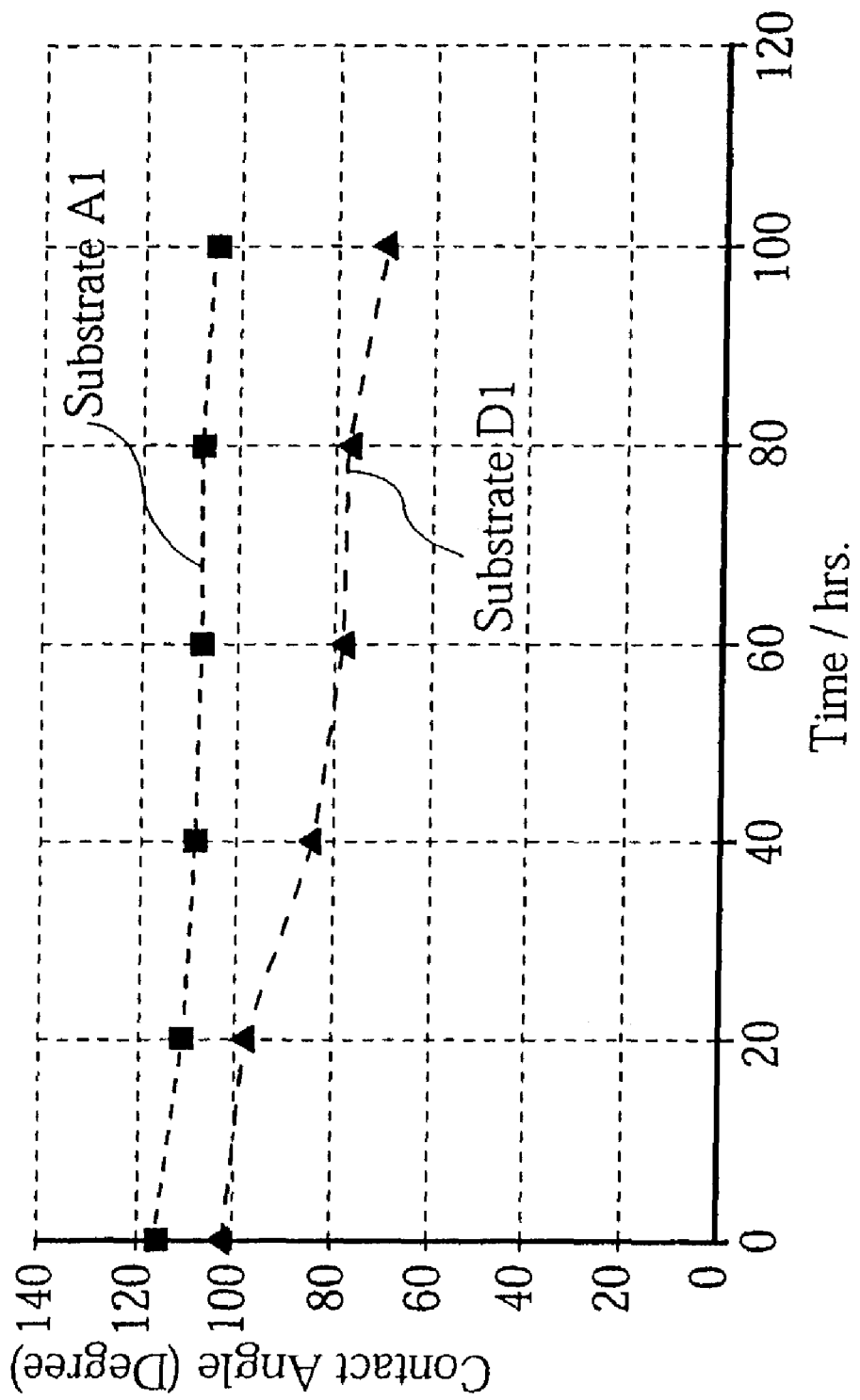
FIG. 5 is a graph showing contact angles changing with time during a heating test.

The results of measurement are shown in FIG. 5. It is to be noted that the substrates A1 and D1 are different from each other only in materials composing the underlying layers thereof.

As is obvious from FIG. 5, the substrate A1 of Example 1 using $Si(OC_2H_5)_4$ had an initial contact angle larger than that of the substrate D1 of Example 2 using $Si(NCO)_4$ and a time-varying reduction in the contact angle of the substrate A1 was smaller than that of the substrate D1. From the results, it will be understood that alkoxysilane is superior to isocyanatesilane as the component of the underlying layer in terms of enhancing water repellency and resistance of the functional film.

EXAMPLE 3

A substrate E1 according to Example 3 was fabricated in the same manner as in Example 1 except that $C_8F_{17}C_2H_4Si(OC_2H_5)_3$ was used in place of $C_8F_{17}C_2H_4SiCl_3$ as the silane-based compound (thin-film component).

[Different Silane-Based Compounds and Resistances]

The relationship between different thin-film components and resistances was examined in accordance with the heat resistance test method by using the substrates E1 of Example 3 and the substrate A1 of Example 1.

Figure 6:
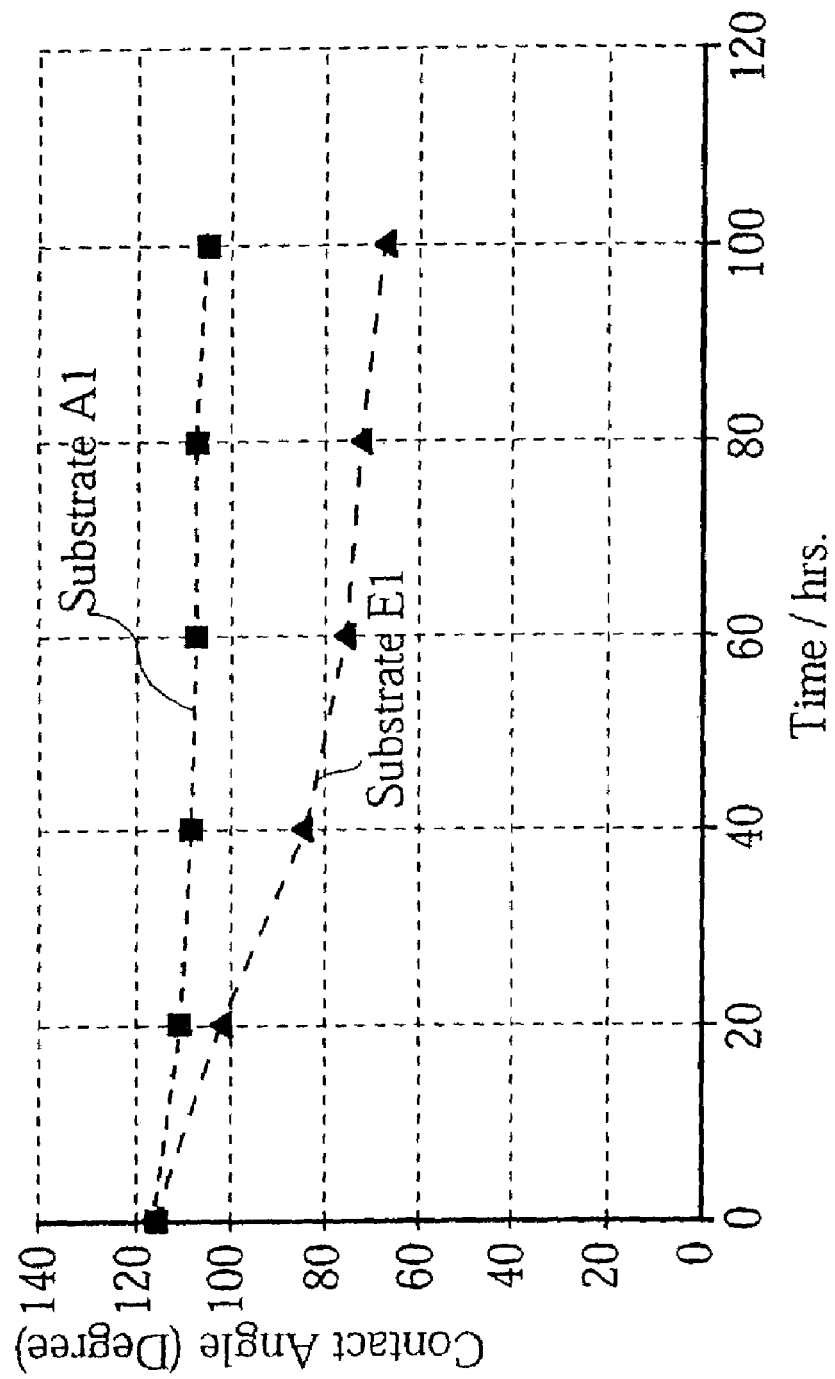
FIG. 6 is a graph showing contact angles changing with time during the heating test.

FIG. 6 shows the results of measurement. As is apparent from FIG. 6, a time-varying reduction in the contact angle of the substrate A1 (Example 1) using $C_8F_{17}C_2H_4SiCl_3$ as the silane-based compound was smaller than that of the substrate E1 (Example 3) using $C_8F_{17}C_2H_4Si(OC_2H_5)_3$, though the initial contact angles of the two substrates were the same. From the results, it will be understood that a trichlorosilane-based compound is superior as the silane-based compound in terms of resistance.

EXAMPLE 4

A substrate F1 according to Example 4 was fabricated in the same manner as in Example 1 except that hexamethyldisiloxane (straight-chain silicone) was used in place of $C_8F_{18}$.

[Different Solvents and Resistances]

A comparison was made between the respective performances of the substrate F1 of Example 4 and the substrate A1 of Example 1 by using the heat resistance test method described above.

Figure 7:
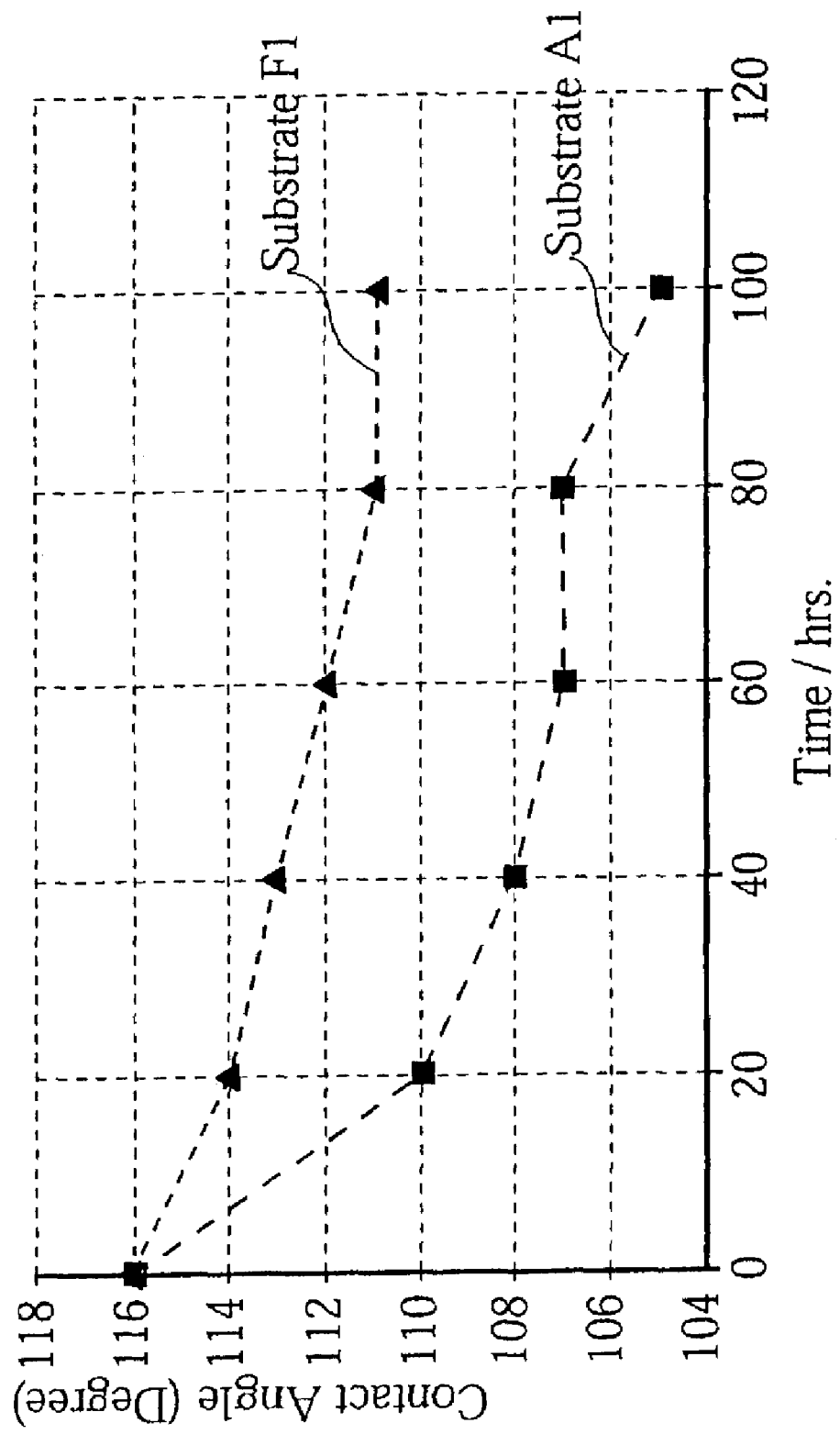
FIG. 7 is a graph showing contact angles changing with time during the heating test.

FIG. 7 shows the results of measurement. As is apparent from FIG. 7, a time-varying reduction in the contact angle of the substrate F1 (Example 4) using hexamethyldisiloxane as a solvent for dissolving the silane-based compound therein was smaller than that of the substrate A1 (Example 1) using $C_8F_{18}$, though the initial contact angles of the two substrates were the same. From the results, it will be understood that hexamethylsiloxane is superior as the solvent for dissolving the silane-based compound therein in terms of providing the functional film resistant to a high temperature.

The same results as shown above were obtained when cyclohexamethyltrisiloxane (cyclic silicone) was used.

EXAMPLE 5

A substrate G1 according to Example 5 was fabricated in the same manner as in Example 1 except that $C_{10}H_{21}SiCl_3$ was used as the silane-based compound.

EXAMPLE 6

A substrate H1 according to Example 6 was fabricated in the same manner as in Example 1 except that $SiCl_4$ was used as the silane-based compound.

[Anti-Contamination Property Test]

An anti-contamination property test was conducted on each of the substrates G1 (Example 5), H1 (Example 6), and A1 (Example 1) to compare the respective performances of the coatings on the substrates G1, H1, and A1. The following is a method for the anti-contamination property test. First, 0.2 cc of a syrup composed of sugar/soy sauce=1/1 (weight ratio) is applied dropwise onto each of the substrates and baked at 300° C. for 15 minutes. Thereafter, the sticked syrup is wiped off with wet cloth. Then, 0.2 cc of the syrup is applied again onto each of the substrates and baked at 300° C. for 15 minutes. The sticked syrup is wiped off in the same manner as described above. The cycle was repeatedly performed till the sticked syrup could not be wiped off any more and the number of cycles was counted. Table 1 shows the results of counting.

TABLE 1

| | Name of Substrate | | |
|---|---|---|---|
| | A1 | G1 | H1 |
| Number of Cycles Counted After Final Baking | 28 | 12 | 1 |

If the results of Table 1 are listed in order of decreasing anti-contamination property in the relationship between the type of the silane-based compound and the anti-contamination property, $C_8F_{17}C_2H_4SiCl_3$ (Substrate A1)>>$C_{10}H_{21}SiCl_3$ (Substrate G1)>>$SiCl_4$ (Substrate H1) is satisfied to indicate that $C_8F_{17}C_2H_4SiCl_3$ and $C_{10}H_{21}SiCl_3$ had excellent anti-contamination properties. Of the two, $C_8F_{17}C_2H_4SiCl_3$ had a more excellent anti-contamination property. On the other hand, $SiCl_4$ had substantially no anti-contamination property.

From the results, it can be concluded that the use of the silane-based compound having an alkyl group or a fluoro-alkyl group is preferable for improving the anti-contamination property.

[Experiment]

Each of the foregoing examples has performed the immersion and raising of the substrate in and from the silane-based compound solution in the anhydrous atmosphere. Here, the influence of a humidity in the ambient atmosphere during the coating of the silane-based compound solution onto each of substrates formed with the underlying layer was examined. In accordance with the method used for the experiment, the substrates formed with functional films are fabricated in the same manner as in Example 4, except that the method is implemented by providing the relative humidity in the ambient atmosphere during the immersion and raising of the substrates in and from the silane-based compound solution with eight settings of 5, 10, 15, 20, 25, 30, 35, and 40% and the outer appearances of the substrates during and after the formation of the functional films are observed by the naked eye.

When the substrates fabricated under the individual humidity conditions were observed, the substrates having the same outer appearances as in the anhydrous atmosphere (5% or less) were obtained under the humidity conditions of 30% or less. Under the humidity conditions of 40% or more, by contrast, white products assumed to be the reaction products between water in the atmosphere and the silane-based compounds were recognized. Such a white product was barely observed at the humidity of 35%. From the foregoing, it can be concluded that the contact of the silane-based compound solution with the substrate is performed preferably in an atmosphere at a relative humidity of 35% or less.

EXAMPLE 7

The present example corresponds to a functional film according to a second embodiment.

As a compound represented by $X'$—$(AlOX')_n$—$AlX'_2$ (where X' is an alkoxy group and n is an integer equal to or more than 0), $Al(OC_2H_5)_3$ was prepared and the underlying layer solution containing $Al(OC_2H_5)_3$/HCl/water/isopropyl alcohol=1/0.01/5/25 (at a molar ratio) was produced. An unsintered underlying layer composed of $Al(OC_2H_5)_3$ was formed on a surface of a glass plate by immersing the glass plate in the underlying layer solution, raising it therefrom at a speed of 1 mm/second, and drying it at a temperature of 80° C. for 15 minutes.

Next, $C_8F_{17}C_2H_4SiCl_3$ and $C_8F_{18}$ were prepared as a silane-based compound and as a solvent for dissolving the compound therein, respectively, so that a silane-based compound solution having a composition ratio (at a volume ratio) of $C_8F_{17}C_2H_4SiCl_3/C_8F_{18}$=1/99 was produced. Then, the silane-based compound solution was coated on the surface of the glass plate by the technique of immersing the glass plate formed with the underlying layer (unsintered) in the silane-based compound solution and raising it therefrom at a speed of 1 mm/second in an anhydrous atmosphere at a relative humidity of 5% or less. Thereafter, the solvent ($C_8F_{18}$) on the surface of the glass plate was evaporated therefrom and the glass plate was sintered at 400° C. for 15 minutes, whereby a substrate-A2 having a functional film was fabricated.

Figure 8:
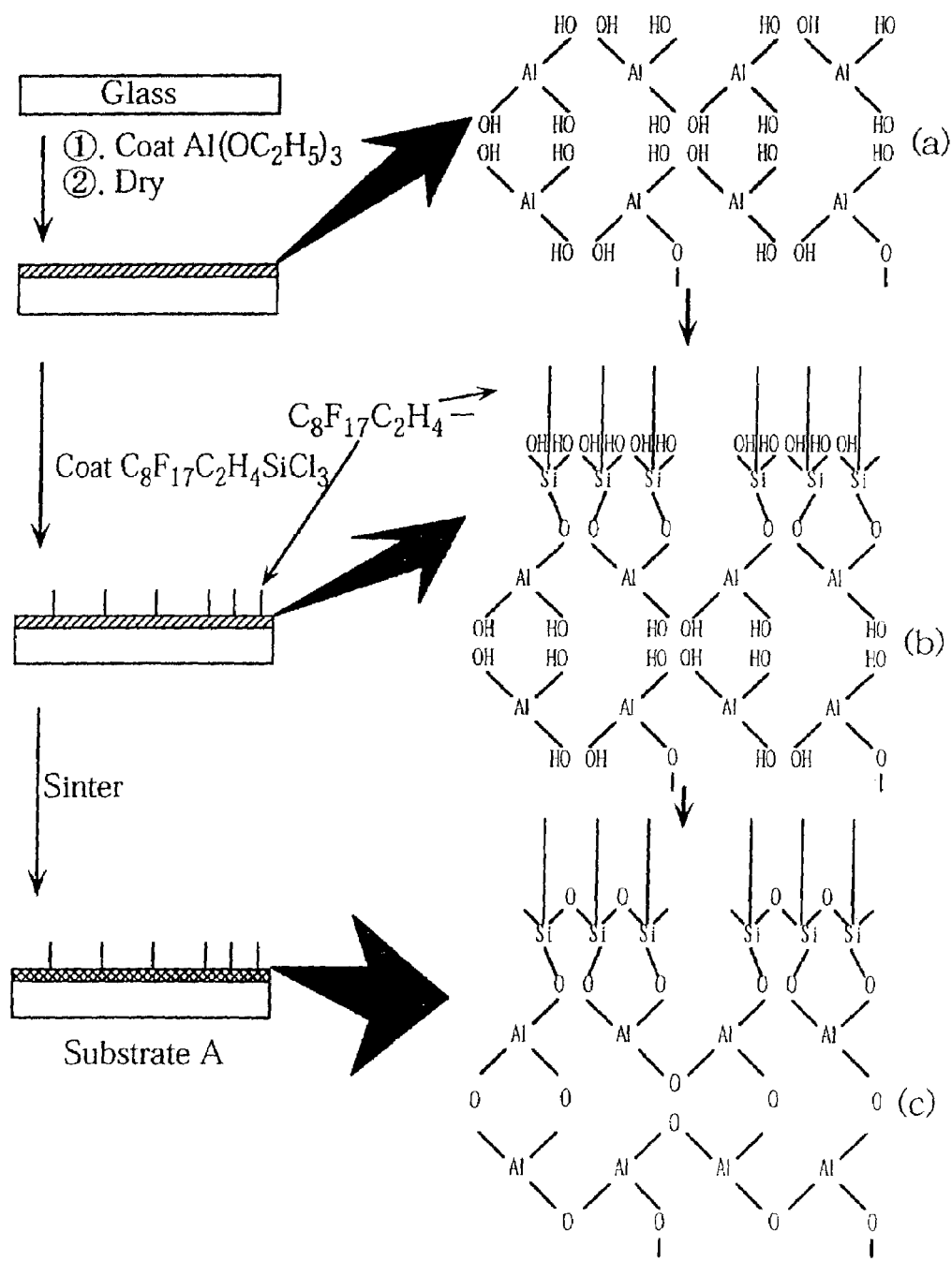
FIG. 8 are conceptual views for illustrating a method of fabricating a functional film according to the present invention.

FIG. 8 are conceptual views for illustrating the flow of the fabrication method. FIG. 8(a) is a view diagrammatically showing the state of the underlying layer when the underlying layer solution is coated and dried on the glass plate. When the underlying layer solution is coated and dried at a temperature not more than the sintering temperature, as shown in FIG. 8(a), $Al(OC_2H_5)_3$ molecules located near the surface of the glass plate are bonded to OH groups at the surface of the glass plate by a dealcohol reaction (—O—), while the majority of $Al(OC_2H_5)_3$ molecules which are not bonded to the OH groups at the substrate react with ambient moisture (e.g., humidity in the atmosphere) present in an extremely small amount. This causes the underlying layer to be bonded and fixed to the substrate and increases the OH groups at the surface of the underlying layer.

FIG. 8(b) is a diagrammatic view showing the state of the underlying layer coated with the silane-based compound solution, in which the silane-based compound ($C_8F_{17}C_2H_4SiCl_3$) is chemically bonded (adsorbed) to the portions of the OH groups at the surface of the underlying layer. FIG. 8(c) is a view showing the state of the substrate after sintering, in which the constituent molecules of the underlying layer are polymerized.

Hereinafter, a glass plate formed with a functional film will be referred to as a substrate and a method of performing sintering after the coating of the silane-based compound solution without performing sintering during the formation of the underlying layer will be referred to as a post-sintering method.

COMPARATIVE EXAMPLE 3

A substrate-B2 having a functional film was fabricated in the same manner as in Example 7 described above except that the underlying layer (sintered underlying layer) was formed in accordance with a method of sintering the glass plate coated with the underlying layer solution at 400° C. for 15 minutes, instead of drying it at 80° C. for 15 minutes, and that post-sintering at 400° C. for 15 minutes was not performed with respect to the glass plate coated with the silane-based compound solution.

Figure 15:
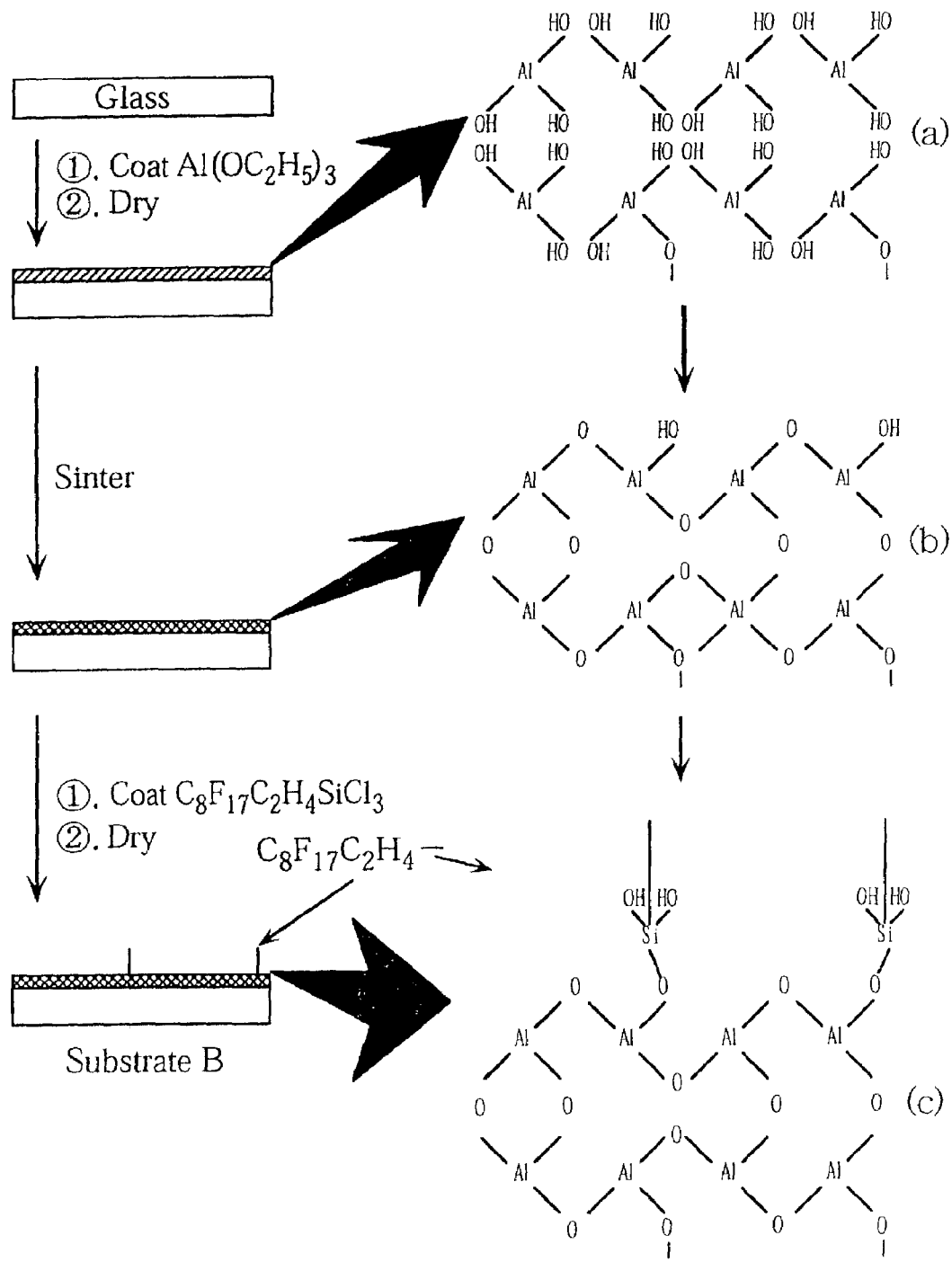
FIG. 15 are conceptual views for illustrating a conventional method of fabricating a functional film.

FIG. 15 are conceptual views of the method. FIG. 15(a) diagrammatically shows the state of the glass plate on which the underlying layer solution has been coated and dried, which is similar to FIG. 1(a). FIG. 15(b) shows the state of the sintered underlying layer in which the OH groups at the surface of the underlying layer have been partly lost as a result of sintering the underlying layer. FIG. 15(c) shows the silane-based compound ($C_8F_{17}C_2H_4SiCl_3$) chemically adsorbed to a reduced number of OH groups.

It is to be noted that the method of Comparative Example 3 relates to the prior art technique and sintering performed during the formation of the underlying layer will be referred to as pre-sintering method.

COMPARATIVE EXAMPLE 4

Figure 16:
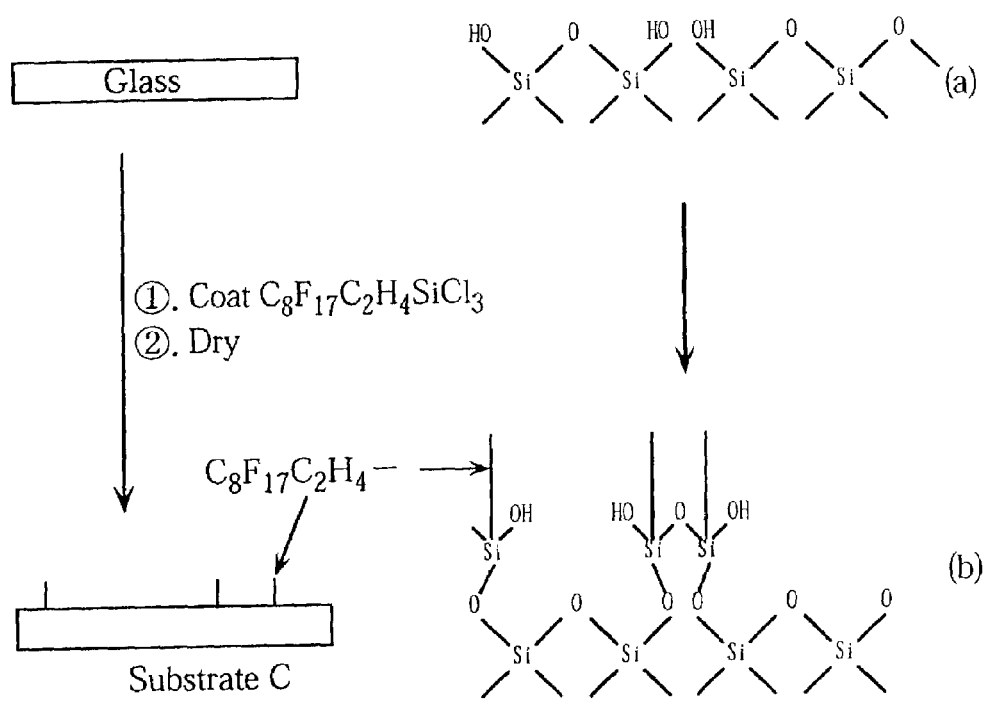
FIG. 16 are conceptual views for illustrating the conventional method of fabricating a functional film in which an underlying layer is not formed.

A substrate-C2 having a functional film according to Comparative Example 4 was fabricated by using an unprocessed glass plate having no underlying layer, immersing the glass plate in the silane-based compound solution, raising it therefrom at a speed of 1 mm/second, and evaporating $C_8F_{18}$. FIG. 16 are conceptual views for illustrating the method.

FIG. 16(a) is a view showing the state of the glass surface. FIG. 16(b) is a view showing the surface of the glass plate coated with $Al(OC_2H_5)_3$ as the component of the underlying layer. When the silane-based compound ($C_8F_{17}C_2H_4SiCl_3$) for forming a coating was coated directly on the glass, the silane-based compound ($C_8F_{17}C_2H_4SiCl_3$) is chemically adsorbed to a reduced number of OH groups present at the glass substrate, as shown in FIG. 16(b), so that a coating at a low density is formed.

[Conditions for Film Formation and Resistances]

Figure 9:
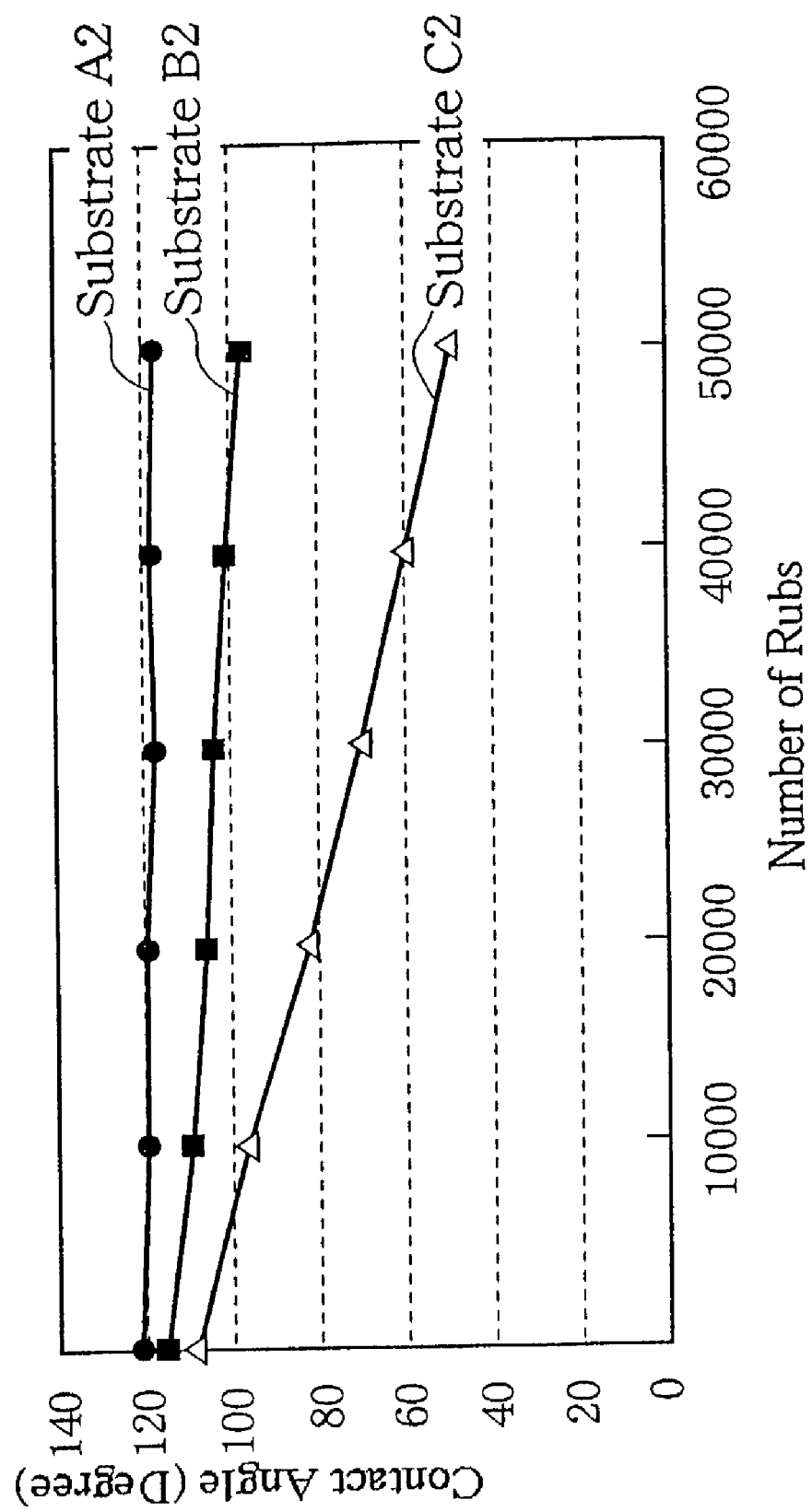
FIG. 9 is a graph showing the relationship between the number of rubs and a contact angle.

The relations among the presence or absence of the underlying layers, different sintering conditions, and contact angles were examined by using the foregoing substrates-A2, B2, and C2. The contact angles were measured as follows. Each of the substrates-A2 to C2 was rubbed 50000 times by using a sponge for washing dishes with the application of a load of 2 kgf, while contamination on the substrate was removed by ultrasonic cleaning using ethanol every 5000 rubs. Thereafter, 10 μl of water was applied dropwise to the surface of each of the substrates formed with the coating and the contact angle was measured. Hereinafter, the method for measurement will be referred to as a rubbing resistance test method. FIG. 9 shows the results of measurement.

As is obvious from FIG. 9, the substrate-A2 (Example 7) fabricated in accordance with the method of the present invention had a large initial contact angle and the lowering of the contact angle was barely recognized even after it was rubbed by using the sponge. By contrast, the substrate-B2 (Comparative Example 3) fabricated in accordance with the pre-sintering method had an initial contact angle smaller than that of the substrate-A2 and the contact angle had a tendency to lower after it was rubbed by using the sponge. The substrate-C2 (Comparative Example 4) had an initial contact angle smaller than that of the substrate-B2 and the contact angle lowered significantly after it was rubbed by using the sponge.

The foregoing results have proved that the functional film with excellent water repellency and high resistance can be formed in accordance with the fabrication method of the present invention.

The foregoing results will be examined based on FIGS. 8, 15, and 16. The reason for the superior contact angle and rubbing resistance of the substrate-A2 which had not been pre-sintered may be that a high-quality thin film in which the molecules of the silane-based compound were chemically bonded uniformly and densely was formed on the surface of the underlying layer due to the high density of the OH groups during the coating of the coating forming solution and the constituent molecules of the underlying layer and the constituent molecules of the coating were polymerized by sintering performed subsequently to form a solid structure.

On the other hand, the reason for the rubbing resistance and the like of the substrate-B2 having the pre-sintered underlying layer which were inferior to those of the substrate-A2 may be that a non-uniform coating having a reduced number of bound points was formed because the substrate surface lost hydroxyl groups due to pre-sintering. The reason for the small initial contact angle and low resistance to rubbing of the substrate-C2 using the glass substrate having no underlying layer without any alterations may be that a non-uniform thin film having suspended molecules of the silane-based compound which were not bonded directly to the substrate was formed because the substrate-C2 had a reduced number of portions of active hydrogens to which the molecules of the silane-based compound were to be bonded.

EXAMPLE 8

The present example corresponds to a functional film according to a third embodiment. As a mixture (hydrolyzable) of a compound represented by X—$(SiOX_2)_n$—$SiX_3$ (where X is at least one functional group selected from the group consisting of a halogen, an alkoxy group, and an isocyanate group and n is an integer equal to or more than 0) and a compound represented by X'—$(AlOX')_n$—$AlX'_2$ (where X' is an alkoxy group and n is an integer equal to or more than 0), a mixture of $Si(OC_2H_5)$ and $Al(OC_2H_5)_3$ was prepared so that two-component underlying layer solutions at six mixture ratios of 10/90, 25/75, 50/50, 75/25, 90/10, 100/0 each of which is the mixture ratio between the two compounds represented as number of moles of Si/number of moles of Al (fraction/denominator). Then, an underlying layer was formed by using the two-component underlying layer solution. Except for that, substrates-D2, E2, F2, G2, H2, and I2 according to Example 8 were fabricated in the same manner as in Example 7.

[Different Components of Underlying Layers and Rubbing Resistances]

Figure 10:
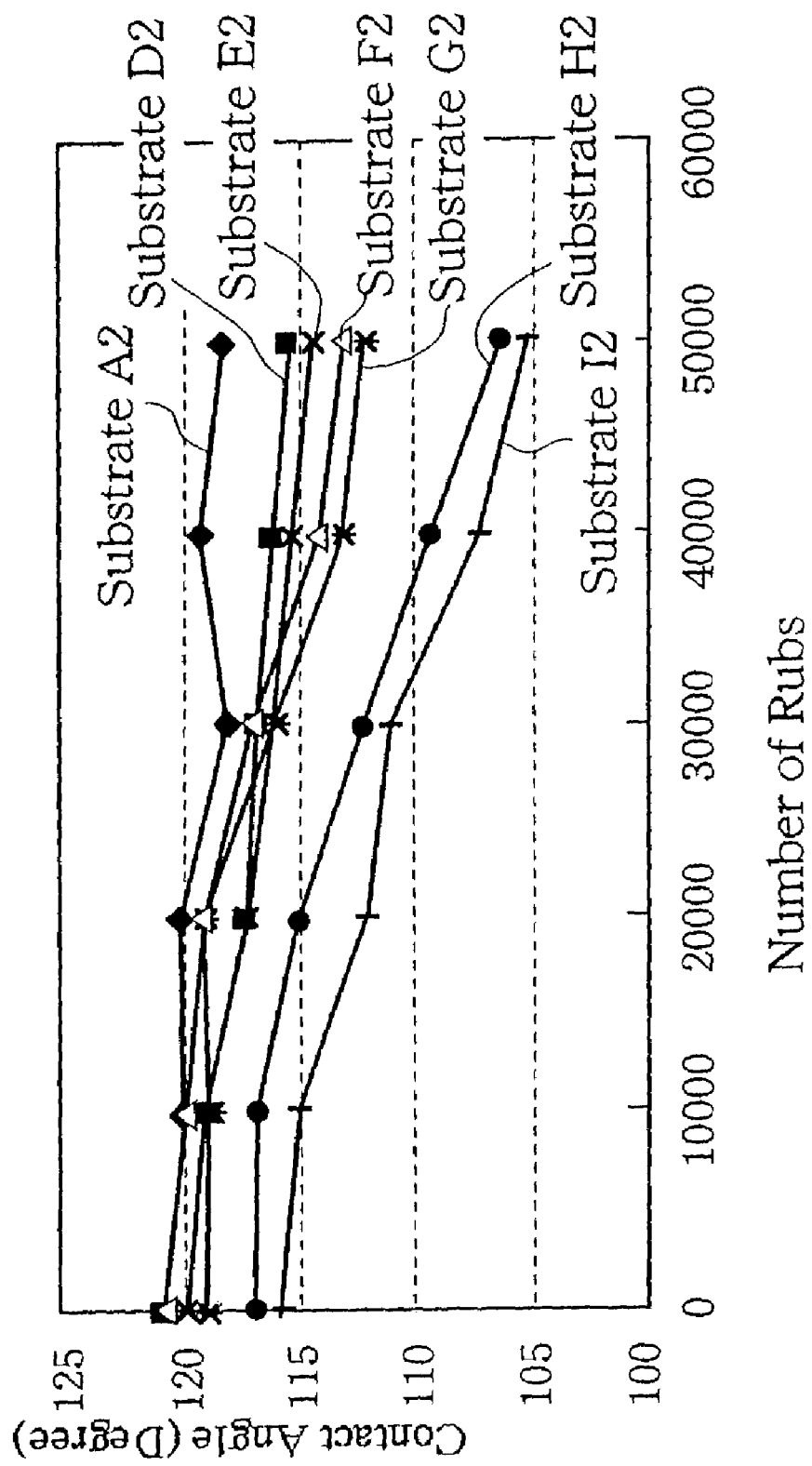
FIG. 10 is a graph showing the relationship between the number of rubs and the contact angle.

The difference in resistance between the substrates-A2 according to Example 7 and the substrates-D2 to I2 according to Example 8 was examined in accordance with the rubbing resistance test method described above. FIG. 10 shows the results of measurement.

As is obvious from FIG. 10, the substrate-A2 in which $Al(OC_2H_5)_3$ was used alone was remarkably superior in initial contact angle and in rubbing resistance to the substrate-I2 in which $Si(OC_2H_5)_4$ was used alone. The time-varying reductions in contact angle of the substrates-A2 (Example 7), -D2, -E2, -F2, -G2, -H2, and -I2 (substrates-D2 to I2; Example 8) were in increasing order.

The foregoing results have proved that a functional film with high abrasion resistance can be obtained if the compound represented by $X'—(AlOX')_n—AlX'_2$ (where X' is an alkoxy group and n is an integer equal to or more than 0) is used alone. The reason for the contact angle reduced by rubbing may be that the substrate surface gradually loses the molecules ($C_8F_{17}C_2H_4—$) composing a surface-property modifying coating due to rubbing. From the foregoing, it can be considered that the foregoing results reflect the strength and hardness of the underlying layer which decrease as the composition ratio of Si increases and, as a result, rubbing has significantly reduced the contact angle.

[Different Components of Underlying Layers and Temperature Resistances]

Figure 11:
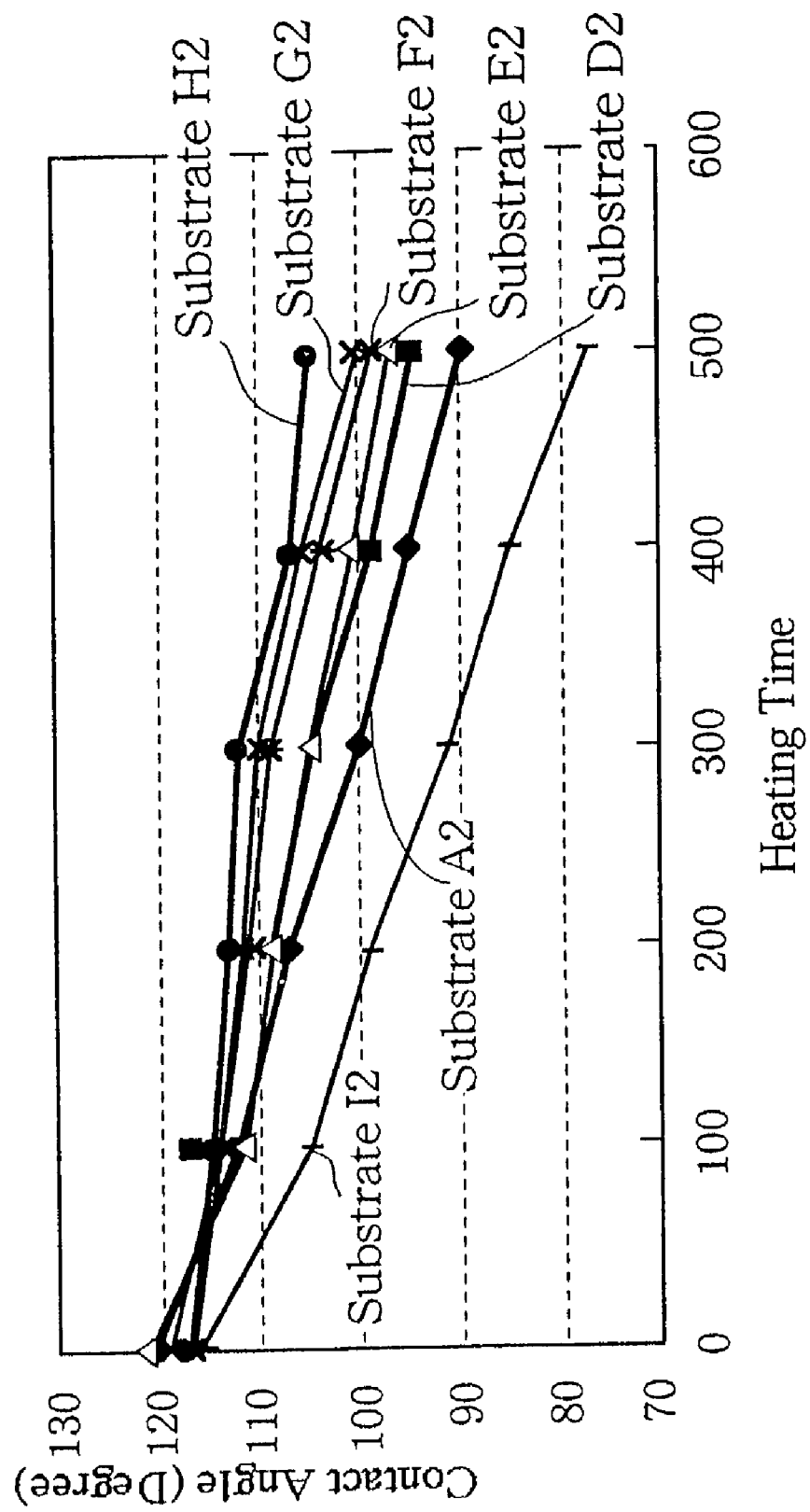
FIG. 11 is a graph showing contact angles changing with time during a heating test.

The difference in temperature resistance between the substrate-A2 according to Example 7 and the substrate-D2 according to Example 8 was examined in accordance with the heat resistance test method. Specifically, the substrates A2 and D2 were allowed to stand in an atmosphere heated to 300° C. for 1000 hours. In the meantime, contamination on each of the substrates was removed by ultrasonic cleaning using ethanol every 100 hours. Thereafter, the contact angle was measured by applying dropwise 10 μl of water to the surface of each of the substrates formed with a coating. FIG. 11 shows the results of measurement.

As is apparent from FIG. 11, the contact angles changed with time such that the substrate-I2 (100/0)>the substrate-A2 (0/100)>the substrate-D2 (10/90)>the substrate-E2 (25/75)>the substrate-F2 (50/50)>the substrate-G2 (75/25)>the substrate-H2 (90/10) was satisfied and it was found that the contact angles of the substrates I2, A2, D2, E2, F2, G2, and H2 decreased in this order.

The foregoing results have proved that heat resistance of water repellency improves if a mixture of a compound represented by $X—(SiOX_2)_n—SiX_3$ (where X is at least one functional group selected from the group consisting of a halogen, an alkoxy group, and an isocyanate group and n is an integer equal to or more than 0) and a compound represented by $X'—(AlOX')_n—AlX'_2$ (where X' is an alkoxy group and n is an integer equal to or more than 0) is used in the underlying layer solution. It has also been proved that a functional film with further higher heat resistance can be obtained if a Si/Al ratio of the two-component underlying layer solution is adjusted to be 1 or more. The foregoing results are closely related to the density of the underling layer and it can be considered that a substrate having a denser underlying layer has higher temperature resistance.

EXAMPLE 9

A substrate-J2 according to Example 9 was fabricated similarly to the substrate-H2 (Si/Al=90/10) according to Example 8 except that, instead of $Si(OC_2H_5)_4$, $Si(NCO)_4$ was used as the compound represented by $X—(SiOX_2)_n—SiX_3$ (where X is at least one functional group selected from the group consisting of a halogen, an alkoxy group, and an isocyanate group and n is an integer equal to or more than 0).

[Types of Components of Underlying Layers and Resistances]

Figure 12:
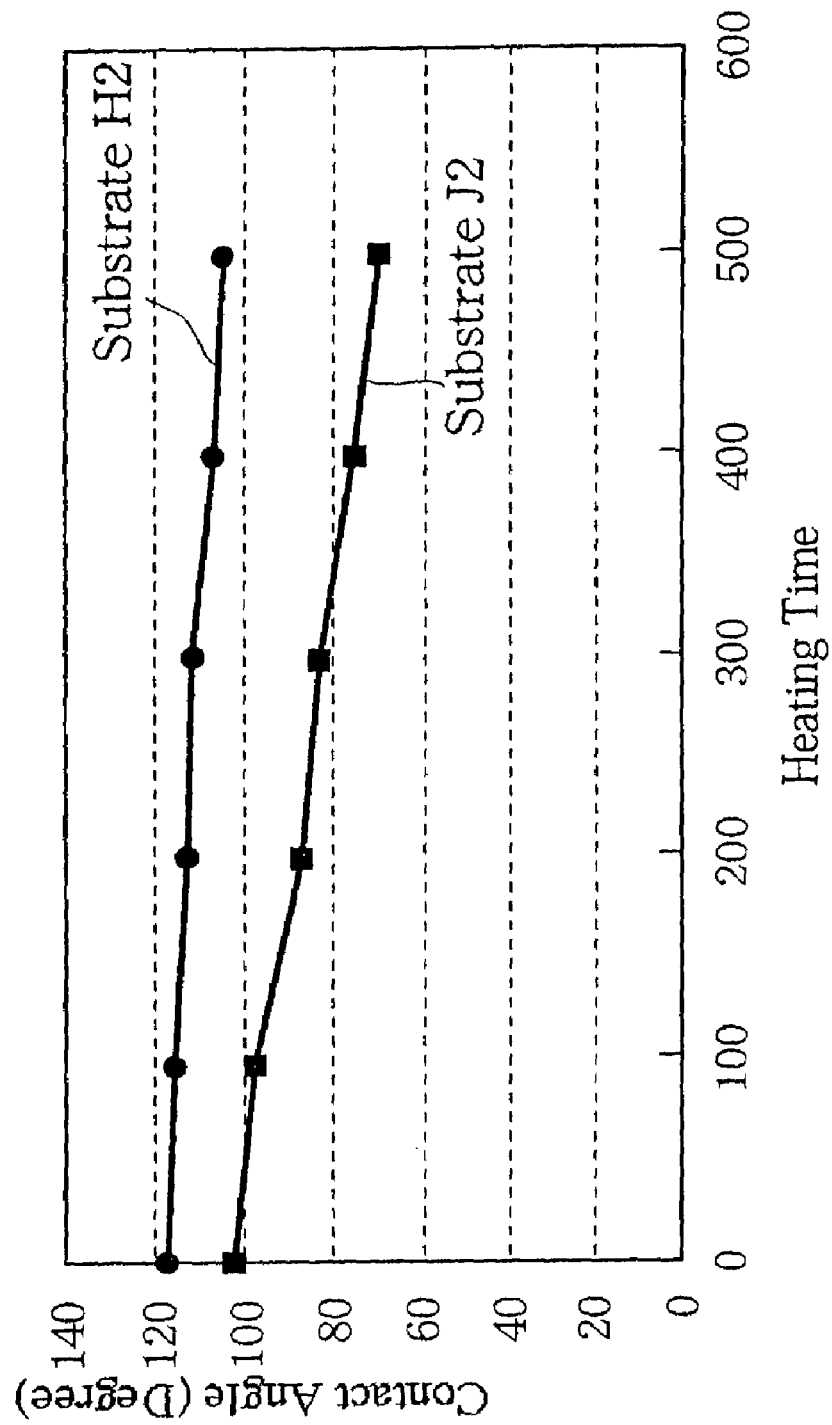
FIG. 12 is a graph showing contact angles changing with time during the heating test.

The temperature resistances of the substrate-H2 according to Example 8 and the substrate-J2 according to Example 9 were examined by the heat resistance test method described above. FIG. 12 shows the results of the test.

As is obvious from FIG. 12, the substrate-H2 of Example 8 using $Si(OC_2H_5)_4$ and $Al(OC_2H_5)_3$ as the components of the underlying layer had an initial contact angle larger than that of the substrate-J2 of Example 9 using $Si(NCO)_4$ and $Al(OC_2H_5)_3$ and the contact angle of the substrate-H2 had a smaller change with time than that of the substrate-J2. The results have proved that the two-component underlying layer solution using alkoxysilane is superior to the two-component underlying layer solution using isocyanatesilane in terms of enhancing the water repellency and resistance of the functional film.

EXAMPLE 10

A substrate-K2 according to Example 10 was fabricated in the same manner as in Example 7 except that $C_8F_{17}C_2H_4Si(OC_2H_5)_3$ was used in place of $C_8F_{17}C_2H_4SiCl_3$ as the silane-based compound (main component of the functional film). In Example 10, a one-component underlying layer was used.

[Different Silane-Based Compounds and Resistances]

Figure 13:
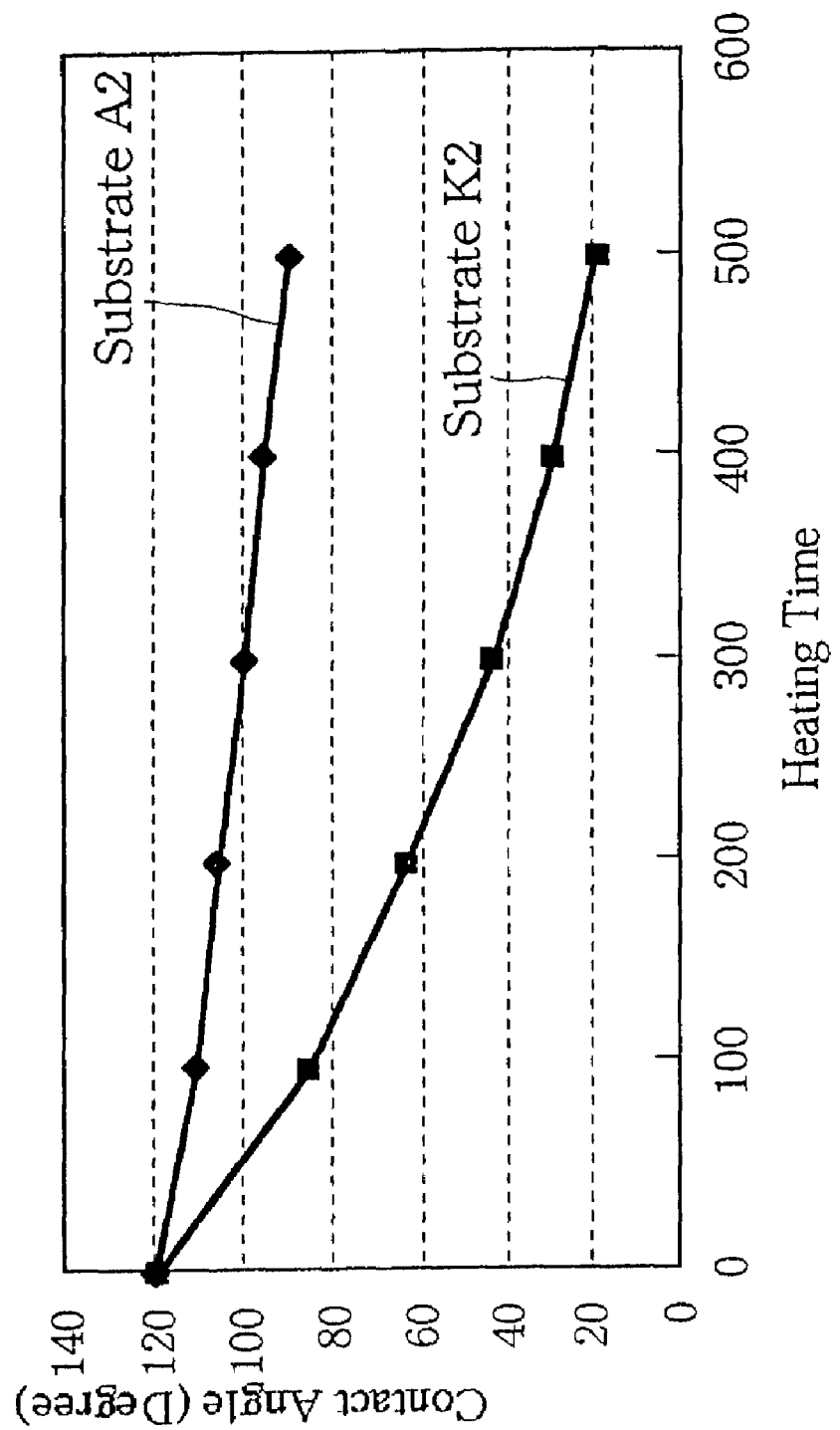
FIG. 13 is a graph showing contact angles changing with time during the heating test.

By using the substrate-K2 according to Example 10 and the substrate-A2 according to Example 7, the relationship between different thin-film components (main components of the functional films) and resistances was examined by the heat resistance test method described above. FIG. 13 shows the results of the test.

As is apparent from FIG. 13, the substrate-A2 (Example 7) using $C_8F_{17}C_2H_4SiCl_3$ as the silane-based compound had a remarkably smaller time varying reduction in contact angle than the substrate-K2 (Example 10) using $C_8F_{17}C_2H_4Si(OC_2H_5)_3$, though the initial contact angles of the two substrates were the same. From the results, it will be understood that a trichlorosilane-based compound is preferable as the silane-based compound as the main component of the functional film in terms of resistance.

EXAMPLE 11

A substrate-L2 according to Example 11 was fabricated in the same manner as in Example 7 except that hexamethyldisiloxane (straight-chain silicone) was used in place of $C_8F_{18}$ as a solvent for dissolving the silane-based compound therein.

[Different Silane-Based Compounds and Resistances]

Figure 14:
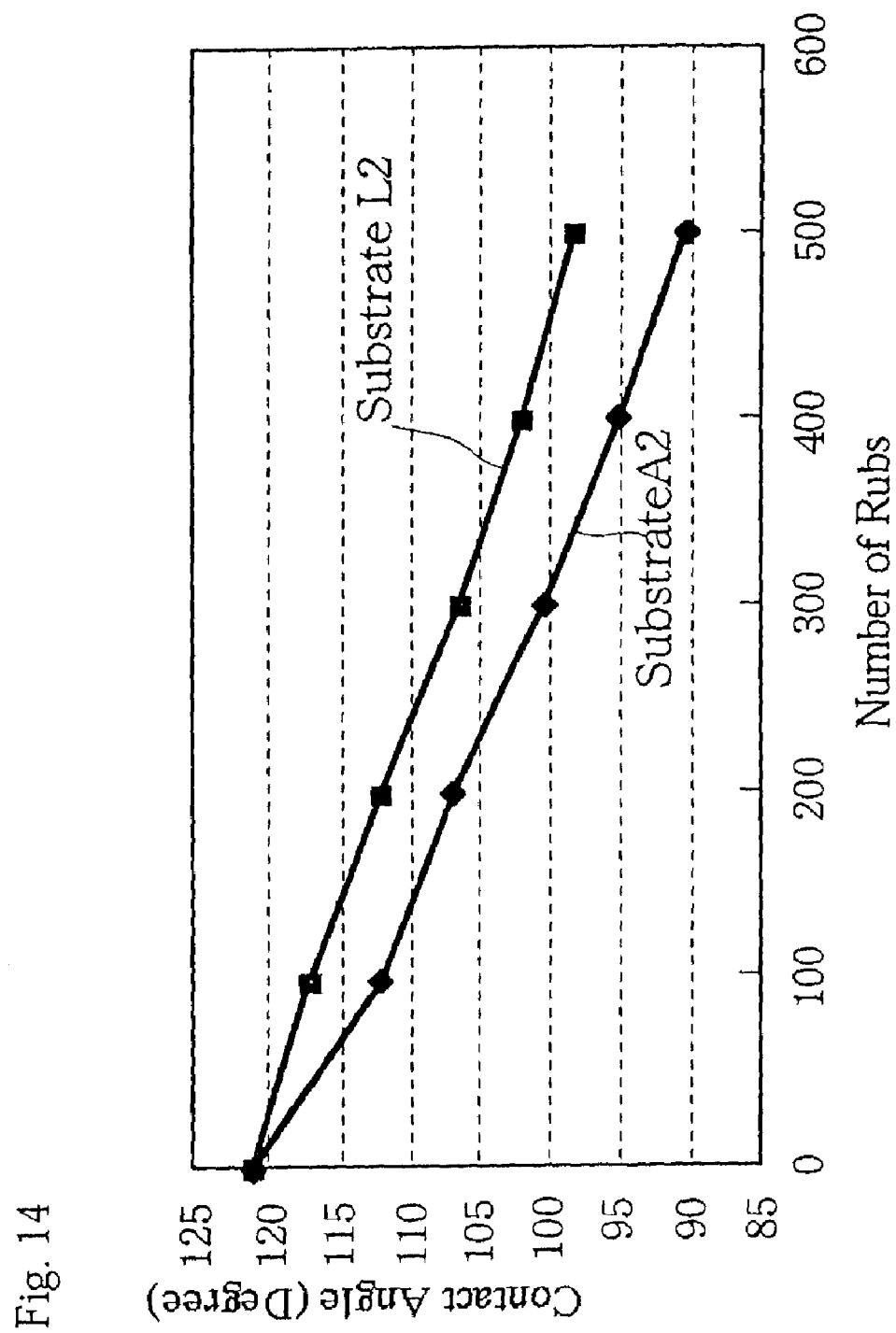
FIG. 14 is a graph showing contact angles changing with time during the heating test.

A comparison was made between the respective performances of the substrate-L2 of Example 11 and the substrate-A2 of Example 7 by using the heat resistance test method described above and the relationship between different solvents for dissolving the silane-based compound therein and resistances was examined. FIG. 14 shows the results of the test. As is apparent from FIG. 14, the contact angle of the substrate-L2 (Example 11) using hexamethyldisiloxane had a smaller change with time than that of the substrate-A2 (Example 7) using $C_8F_{18}$, though the initial contact angles of the two substrates were the same. From the results, it will be understood that hexamethyldisiloxane is preferable as the solvent for dissolving the silane-based compound therein in terms of providing a functional film with high high-temperature resistance.

The same results as described above were obtained when cyclohexamethyltrisiloxane (cyclic silicone) was used.

EXAMPLE 12

A substrate-M2 according to Example 12 was fabricated in the same manner as in Example 7 except that $C_{10}H_{21}SiCl_3$ was used in place of $C_8F_{17}C_2H_4SiCl_3$ as the silane-based compound as the main component of the functional film.

EXAMPLE 13

The substrate-N2 according to Example 13 was fabricated in the same manner as in Example 7 except that $SiCl_4$ was used in place of $C_8F_{17}C_2H_4SiCl_3$ as the silane-based compound as the main component of the functional film.

[Relationship Between Type of Silane-Based Compound and Anti-Contamination Property]

By using the substrate-A2 (Example 7), the substrate-M2 (Example 12), and the substrate-N2 (Example 13) which are different only in the type of the silane-based compound as the main component of the functional film, it was examined by the anti-contamination property test whether the anti-contamination property at a surface of each of the substrates is good or not.

The anti-contamination property test was performed as follows. First, 0.2 cc of a syrup composed of sugar/soy sauce=1/1 (weight ratio) is applied dropwise onto each of the substrates and baked at 300° C. for 15 minutes. Thereafter, the sticked syrup was wiped off with wet cloth. Then, 0.2 cc of the syrup is applied again onto each of the substrates and baked at 300° C. for 15 minutes. The sticked syrup was wiped off in the same manner as described above. The cycle was repeatedly performed till the sticked syrup cannot be wiped off any more and the number of cycles was counted. Table 2 shows the results of counting.

TABLE 2

|  | Name of Substrate | | |
| --- | --- | --- | --- |
|  | A2 | M1 | N2 |
| Number of Cycles Counted Before Final Baking | 31 | 13 | 1 |

As is obvious from Table 2, the anti-contamination properties (in decreasing order) were such that the substrate-A2 ($C_8F_{17}C_2H_4SiCl_3$)>>the substrate-M2 ($C_{10}H_2,SiCl_3$)>>the substrate-N2 ($SiCl_4$) was satisfied. Compared with the substrate-N2, the substrate-A2 and substrate-M2 exhibited excellent anti-contamination properties, of which the anti-contamination property of the substrate-A2 was particularly excellent. From the results, it will be understood that a silane-based compound having an alkyl group or a fluoroalkyl group is preferably used to enhance the anti-contamination property of the functional film and, more preferably, the silane-based compound having the fluoroalkyl group is used appropriately.

[Influence of Humidity in Atmosphere during Fabrication]

In Examples 7 to 13 described above, the immersion and raising of each of the substrates in and from the silane-based compound solution was performed in the anhydrous atmosphere at a relative humidity of 5% or more. However, the level of the relative humidity in the ambient atmosphere during the coating of the silane-based compound solution greatly affects the thin-film forming reaction. Accordingly, there was conducted an experiment for examining the influence of the humidity in the ambient atmosphere during the coating of the silane-based compound solution onto the substrate formed with the underlying layer.

In accordance with the method used for the experiment, the substrates formed with functional films are fabricated in the same manner as in Example 11, except that the method is implemented by providing the relative humidity in the ambient atmosphere during the immersion and raising of the substrates in and from the silane-based compound solution with eight settings of 5, 10, 15, 20, 25, 30, 35, and 40% and the outer appearances of the substrates during and after the formation of the functional films are observed by the naked eye.

When the substrates fabricated under the individual humidity conditions were observed, the substrates having the same outer appearances as in the anhydrous atmosphere (5% or less) were obtained under the humidity conditions of 30% or less. Under the humidity conditions of 40% or more, by contrast, white products assumed to be the reaction products between water in the atmosphere and the silane-based compounds were recognized. From the foregoing, it can be concluded that the contact of the silane-based compound solution with the substrate is performed preferably in an atmosphere at a relative humidity of 35% or less.

A description will be given next to examples when the functional film of the present invention is applied to a liquid crystal alignment film.

EXAMPLE 14

Figure 17:
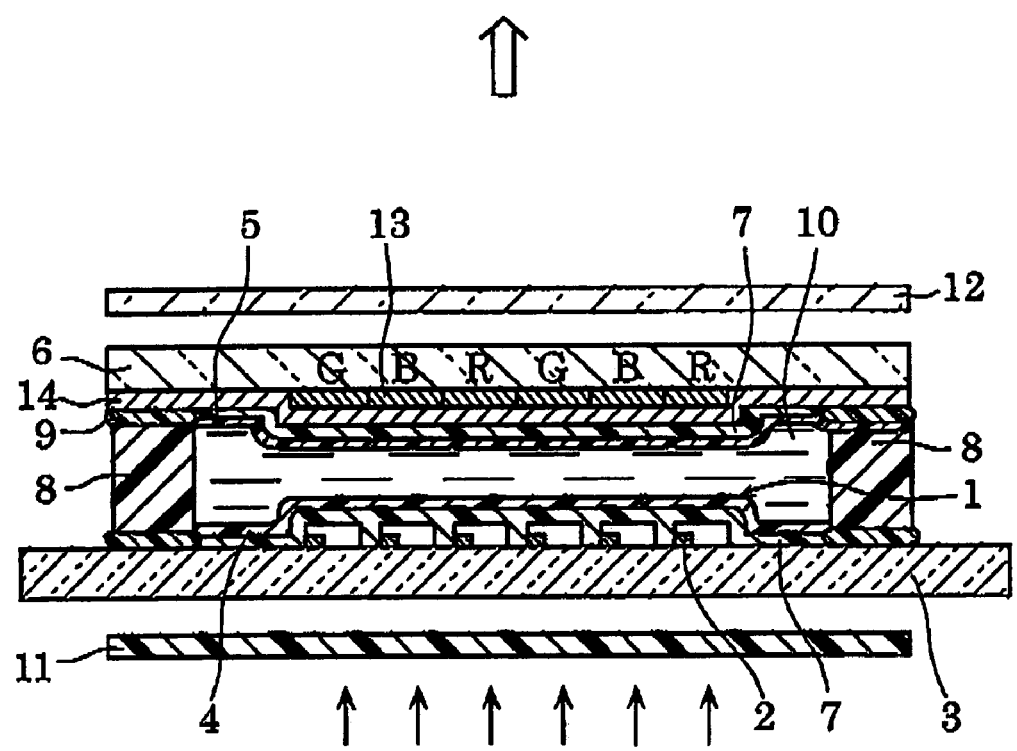
FIG. 17 is a diagrammatic cross-sectional view showing a structure of a liquid crystal display device according to the present invention.

A liquid crystal display device according to the present example was fabricated in accordance with the following method. First, as shown in FIG. 17, an underlying layer 7 was formed on a first substrate 3 having a first group of electrodes 1 formed in a matrix and a group of transistors 2 for driving the electrodes.

Specifically, $Si(OC_2H_5)_4$ was prepared as a compound represented by X—$(SiOX_2)_n$—$SiX_3$ (where X is at least one functional group selected from the group consisting of a halogen, an alkoxy group, and an isocyanate group and n is an integer equal to or more than 0) and an underlying layer solution containing $Si(OC_2H_5)_4$/HCl/water/isopropylalcohol=1/0.01/5/25 (at a molar ratio) was prepared. The underlying layer solution was coated on the region of the first substrate 3 formed with the first group of electrodes 1. At this time, the thickness of the coated film was adjusted to about 1 μm. The coated film was further dried at 80° C. for 15 minutes to form the unsintered underlying layer 7 composed of $Si(OC_2H_5)_4$ on a surface of the first substrate 3 (underlying-layer forming step).

Then, $C_6H_5$—CH=CH—CO—$C_6H_4$—O—$(CH_2)_6$—O—$SiCl_3$ was prepared as a silane-based compound and hexamethyldisiloxane was prepared as a solvent for dissolving the compound therein so that a $10^{-3}$ mol/L of silane-based compound solution containing $C_6H_5$—CH=CH—CO—$C_6H_4$—O—$(CH_2)_6$—O—$SiCl_3$/hexamethyldisiloxane was prepared. The silane-based compound solution was coated by using a printer onto the first substrate 3 formed with the underlying layer 7 (unsintered) in an anhydrous atmosphere at a relative humidity of 5% or less (thin-film forming step). The thickness of the solution film coated was adjusted to about 1 μm. Thereafter, the solvent (hexamethyldisiloxane) remaining on the surface of the first substrate 3 was evaporated and a liquid crystal alignment film 4 was formed by sintering the first substrate 3 at 300° C. for 15 minutes (sintering step).

After the sintering step, the first substrate 3 formed with the liquid crystal alignment film 4 was immersed and cleaned in chloroform as a non-aqueous solvent (cleaning step). The first substrate 3 erected in a desired direction was raised from chloroform for the drainage of chloroform (drainage alignment step). This allowed the molecules composing the liquid crystal alignment film 4 to be aligned inclinedly in a direction of drainage opposite to the direction of raising.

After the drainage alignment step, the liquid crystal alignment film 4 was irradiated with polarized UV light at 400 mJ/cm$^2$ (wavelength: 365 nm) such that the direction of drainage was coincident with the direction of polarization (polarization alignment step), whereby the molecules composing the functional film as the liquid crystal alignment film 4 were crosslinked at the portions of the photosensitive groups along the direction of polarization. In this manner, the functional film as the liquid crystal alignment film 4 in which the film constituent molecules were aligned in the direction of polarization was formed on the first substrate 3.

On the other hand, the same steps as described above were performed with respect to a second substrate 6 having a group of color filters 13 and a second electrode 14 successively provided thereon, whereby an underlying layer 5 and a liquid crystal alignment film 5 oriented in a specified direction as a result of an alignment treatment were formed.

Further, beads were scattered on the first substrate 3 and an adhesive agent 9 with a spacer 8 was coated on the edge portions of the substrate 3 to present a frame-like coated configuration. Subsequently, the first and second substrates 3 and 6 were joined such that the first group of electrodes 1 and the second electrode 14 were in parallel relation and that a cell gap of about 5 μm was provided therebetween. The first and second substrates 3 and 6 had been aligned preliminarily such that a relative cross angle of 90° C. was provided between the direction of the alignment treatment for the liquid crystal alignment film 4 provided on the first substrate 3 and the direction of the alignment treatment for the liquid crystal alignment film 5 provided on the second substrate 6.

Then, a liquid crystal material was injected into the space between the first and second substrates 3 and 6 so that a liquid crystal layer 10 having a TN alignment with a tilt angle of 90° was formed. The respective outer surfaces of the first and second substrates 3 and 6 are provided with polarizing plates 11 and 12 having the directions of optical axes adjusted to provide a normally white mode. In this manner, a TN-type liquid crystal display device O according to the present example was fabricated.

Figure 18:
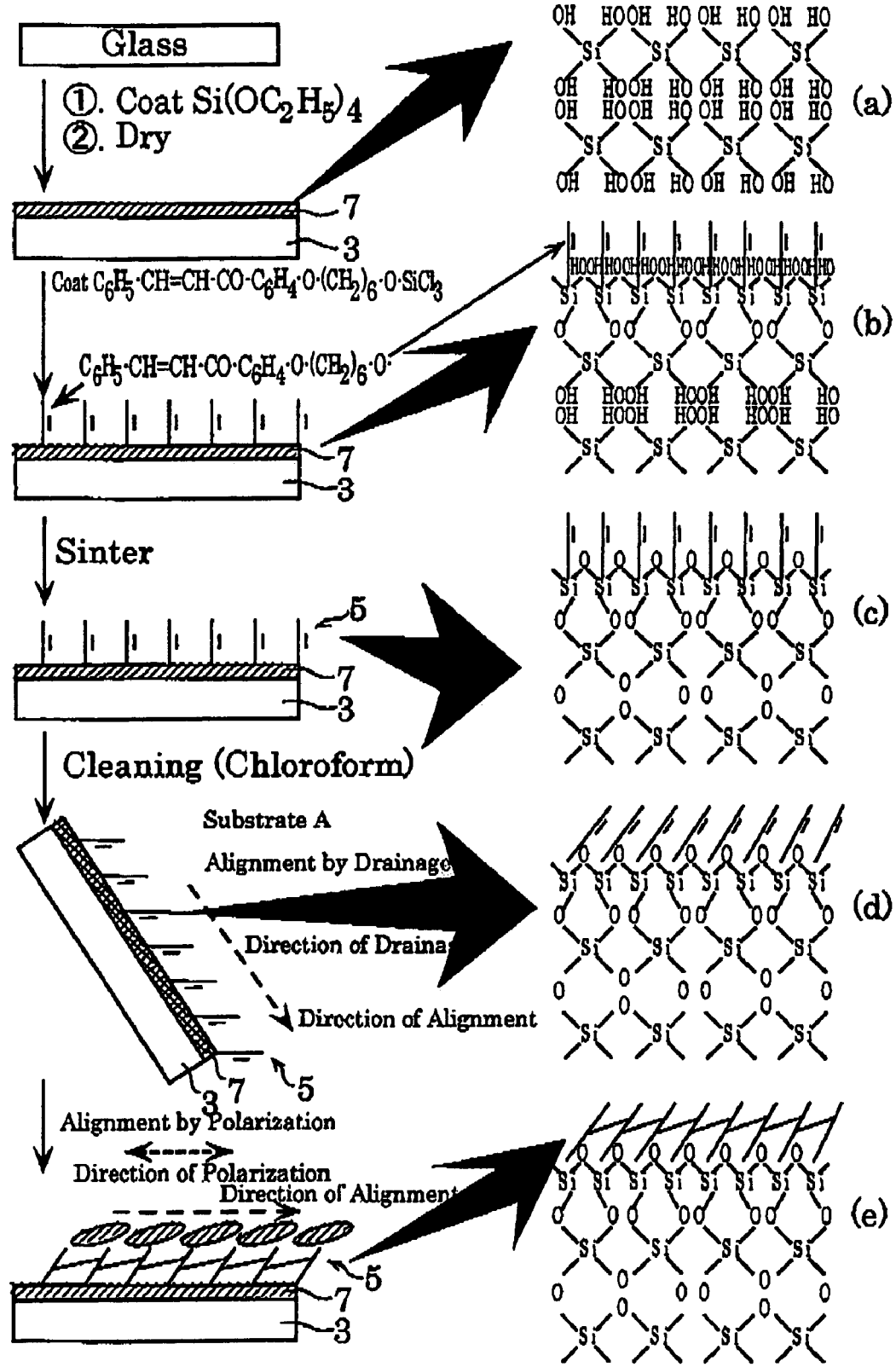
FIG. 18 are conceptual views for illustrating a method of fabricating a liquid crystal alignment film according to the present invention.

FIG. 18 are conceptual views for illustrating the flow of the fabrication method. FIG. 18(a) is a view diagrammatically showing the state of the underlying layer 7 when the underlying layer solution was coated and dried on the first substrate 3. As shown in FIG. 18(a), when the underlying layer solution was coated and dried at a temperature not more than the sintering temperature, Si(OC$_2$H$_5$)$_3$ molecules located near the surface of the first substrate 3 are initially bonded to OH groups at the surfaces of the first substrate 3 and the first group of electrodes 1 by a dealcohol reaction (—O—), while the majority of Si(OC$_2$H$_5$)$_3$ molecules unbonded to the OH groups at the first substrate 3 react with ambient moisture present in an extremely small amount (e.g., a humidity in an atmosphere). This causes the underlying layer 7 to be bonded fixedly to the first substrate 3 and increases the OH groups at the surface of the underlying layer 7.

FIG. 18(b) is a diagram showing the state of the silane-based compound solution coated on the underlying layer 7, in which the silane-based compound (C$_6$H$_5$—CH=CH—CO—C$_6$H$_4$—O—(CH$_2$)$_6$—O—SiCl$_3$) has been chemically bonded (adsorbed) to the portions of the OH groups at the surface of the underlying layer 7. FIG. 18(c) shows the state of the substrate after sintering, in which the constituent molecules of the underlying layer 7 have been polymerized.

FIG. 18(d) is a diagram showing the state of the silane-based compound chemically adsorbed to the surface of the underlying layer 7 after drainage alignment, in which the constituent molecules of the liquid crystal alignment film 5 are aligned inclinedly in the direction of the drainage of the cleaning agent. FIG. 18(e) is a view showing the aligned state of the liquid crystal alignment film 5 after the polarization alignment step, in which the photosensitive groups in the constituent molecules of the liquid crystal alignment film 5 are crosslinked along a direction parallel to the direction of polarization.

COMPARATIVE EXAMPLE 5

A TN-type liquid crystal display device P was fabricated in the same manner as in Example 14 except that the underlying layer (sintered underlying layer) was formed in accordance with a method of sintering the first and second substrates coated with the underlying layer solution at 300° C. for 15 minutes, instead of drying it at 80° C. for 15 minutes, and that post-sintering at 400° C. for 15 minutes was not performed.

COMPARATIVE EXAMPLE 6

By using first and second substrates each having no underlying layer, a functional film as a liquid crystal alignment film was formed by coating the silane-based compound solution onto the substrates in the same manner as in Example 7 and evaporating hexamethyldisiloxane. Then, a TN-type liquid crystal display device Q according to Example 6 was fabricated in the same manner as in Example 14.

[Film-Forming Conditions and Display Characteristics]

By using each of the liquid crystal display devices O, P, and Q described above, the initial alignment of the liquid crystal and contrast for evaluating the display characteristics were examined. The results of the examination are shown in Table 3.

TABLE 3

| | Liquid crystal Display device | | |
|---|---|---|---|
| | O | P | Q |
| Initial Alignment | Aligned in Desired Direction | Aligned in Desired Direction | Not Aligned in Desired Direction (No Alignment) |
| | No Alignment Defect | Some Alignment Defects | Numerous Alignment Defects |

TABLE 3-continued

| | Liquid crystal Display device | | |
|---|---|---|---|
| | O | P | Q |
| Contrast | High | Slightly Low | Considerably Low |

Alignment Defect = Nonuniformity of Domain, Disclination

As is apparent from the table, no alignment defect was observed in the liquid crystal display device O using the functional film of the present invention as the liquid crystal alignment film.

By contrast, the initial alignment of the liquid crystal and display characteristics of the liquid crystal display device Q were considerably degraded. This may be because surface hydroxyl groups having active hydrogens serving as adsorption sites for the silane-based compound are rarely present at the ITO as the material of the electrodes on the surfaces of the first and second substrates. Therefore, it can be said that the effect of the present invention which increases the adsorption sites at which the silane-based compound is adsorbed to the underlying layer is extremely high even in the case where the functional film is used as the liquid crystal alignment film.

The present inventors also examined the initial alignment and contrast of a liquid crystal display device fabricated in the same manner as in Example 14 except that the cleaning step and the drainage alignment step were not performed. In addition, the present inventors also examined a liquid crystal display device fabricated in the same manner as in Example 14 except that the direction of drainage in the drainage alignment step was made different from the direction of polarization in the polarization alignment step. As a result, it was proved that the molecules composing the liquid crystal alignment film were aligned in the direction of polarization and liquid crystal molecules adjacent the liquid crystal alignment film were also aligned in the direction of polarization. However, the initial alignment property and display characteristics equal to those of the liquid crystal display device O were not obtained. Then, the dose of the polarized UV light in the polarization alignment step was increased compared with the dose of the polarized UV light used in Example 14, with the result that characteristics closer to those of the liquid crystal display device O were obtained. From the foregoing, it is apparent that the dose of the polarized UV light can be reduced to a lower level than in the case where the conventional light alignment method is used by adjusting the direction of drainage of the cleaning agent to be in parallel with the direction of polarization of the polarized UV light. This may be because, during the irradiation with the polarized UV light, the photosensitive groups are susceptible to an anisotropic photoreaction in the direction of polarization as a result of preliminarily and temporarily aligning the film constituent molecules of the liquid crystal alignment film through the drainage of the cleaning agent such that they are in parallel relation with the direction of polarization, whereby the reduction in the dose of the polarized UV light was achieved.

Liquid crystal display devices were fabricated in the same manner as in Example 7 by varying the composition of the hydrolyzable mixture of the compound represented by X—(SiOX$_2$)$_n$—SiX$_3$ (where X is at least one functional group selected from the group consisting of a halogen, an alkoxy group, and an isocyanate group and n is an integer equal to or more than 0) and the compound represented by X'—(AlOX')$_n$—AlX'$_2$ (where X' is an alkoxy group and n is an integer equal to or more than 0). In either case, nearly the same initial alignment and display characteristics as those of the liquid crystal display device O were obtained.

Even when liquid crystal display devices were fabricated in the same manner as in Example 14 by preparing $Si(OC_2H_5)_4$ and $Al(OC_2H_5)_3$ as the mixture (hydrolyzable) of the compound represented by X—(SiOX$_2$)$_n$—SiX$_3$ (where X is at least one functional group selected from the group consisting of a halogen, an alkoxy group, and an isocyanate group and n is an integer equal to or more than 0) and the compound represented by X'—(AlOX')$_n$—AlX'$_2$ (where X' is an alkoxy group and n is an integer equal to or more than 0) and varying the composition ratio between the two compounds, it was found that nearly the same initial alignments and display characteristics as those of the liquid crystal display device O were obtained.

EXAMPLE 15

A TN-type liquid crystal display device R according to Example 15 was fabricated in the same manner as in Example 14 except that $C_6H_5$—CH=CH—CO—O—(CH$_2$)$_6$—O—SiCl$_3$ (containing a cinnamoyl group) was used as a silane-based compound (thin-film component) in place of $C_6H_5$—CH=CH—CO—$C_6H_4$—O—(CH$_2$)$_6$—O—SiCl$_3$ (containing a chalconyl group).

EXAMPLE 16

A TN-type liquid crystal display device S according to Example 16 was fabricated in the same manner as in Example 14 except that $C_{10}H_{21}SiCl_3$ (having no photosensitive group) was used as a silane-based compound (thin-film component) in place of $C_6H_5$—CH=CH—CO—$C_6H_4$—O—(CH$_2$)$_6$—O—SiCl$_3$ (containing a chalconyl group).

[Different Silane-Based Compounds and Display Characteristics]

By using each of the TN-type liquid crystal display devices R and S according to Examples 15 and 16 and the liquid crystal display device O according to Example 14, the initial alignment of the liquid crystal and contrast as a display characteristic were examined, the results of which are shown in Table 4.

TABLE 4

| | Liquid crystal Display device | | |
|---|---|---|---|
| | O | R | S |
| Initial Alignment | Aligned in Desired Direction | Aligned in Desired Direction | Not Aligned in Desired Direction |
| | No Alignment Defect | Some Alignment Defects | Numerous Alignment Defects |
| Contrast | High | Low | Considerably Low |

Alignment Defect = Nonuniformity of Domain, Disclination

As is obvious from Table 4, the silane-based compound having a chalconyl group is more excellent in the initial alignment of the liquid crystal and display characteristic than the silane-based compound having a cinnamoyl group. Even in the case of using the liquid crystal alignment film composed of the silane-based compound having the cinnamoyl group, however, it was found that the initial aligned state of the liquid crystal molecules and the display characteristics could be improved. This may be because the sensitivity of the photosensitive group to the polarized UV light of the chalconyl group is higher than that of the cinnamoyl group. It was also found that the liquid crystal molecules were not aligned in a desired direction and the alignment property was degraded in the liquid crystal display device S comprising the liquid crystal alignment film composed of the silane-based compound having no photosensitive group. From the foregoing, it can be considered that the liquid crystal molecules were aligned in the desired directions as a result of the polymerization of the photosensitive groups along the direction of polarization under the radiation of the polarized UV light.

EXAMPLE 17

A TN-type liquid crystal display device T was fabricated in the same manner as in Example 14 except that a rubbing alignment step was performed instead of the polarization alignment step. In a rubbing treatment, the direction of rubbing was made parallel to the direction of drainage alignment and the surface of the liquid crystal alignment film was rubbed at a speed of 500 m/minutes and to a pushing depth of 0.4 mm by using nylon cloth (in which a fabric diameter is 16 to 20 μm and the length of a pile is 3 mm).

[Alignment Method and Display Characteristics]

By using each of the TN-type liquid crystal display devices T according to Example 17 and the liquid crystal display device O according to Example 14, the initial alignment of the liquid crystal and contrast as a display characteristic were examined, the results of which are shown in Table 5.

TABLE 5

| | Liquid crystal Display device | |
|---|---|---|
| | O | T |
| Initial Alignment | Aligned in Desired Direction No Alignment Defect | Aligned in Desired Direction No Alignment Defect Numerous Surface Scratches Were Observed Microscopically |
| Contrast | High | High |

Alignment Defect = Nonuniformity of Domain, Disclination

As is obvious from Table 5, numerous rubbing lines were observed microscopically at the surface of the liquid crystal alignment film. However, the liquid crystal molecules were aligned in a desired direction and no alignment defect was observed, similarly to the liquid crystal alignment film O. In addition, display characteristics including high contrast were also obtained.

By using, as the silane-based compound (thin-film component), $C_{10}H_{21}SiCl_3$ (having no photosensitive group) in place of $C_6H_5$—CH=CH—CO—$C_6H_4$—O—$(CH_2)_6$—O—$SiCl_3$ (containing a chalconyl group), it was examined whether or not the presence of a photosensitive group affects the initial alignment of the liquid crystal molecules and display characteristics in the liquid crystal display device T. As a result, the same initial alignment and display characteristics as those of the liquid crystal display device T were obtained even in the case of using $C_{10}H_{21}SiCl_3$. Hence, it was concluded that the initial alignment of the liquid crystal molecules is attributable to the rubbing treatment.

The present inventors also examined the initial alignment and contrast of a liquid crystal display device fabricated in the same manner as in Example 14 except that the cleaning step and the draining alignment step were not performed. In addition, the present inventors also examined a liquid crystal display device fabricated in the same manner as in Example 14 except that the direction of drainage in the drainage alignment step was made different from the direction of the rubbing treatment in the rubbing step. As a result, it was found that the molecules composing the liquid crystal alignment film were aligned in the direction of the rubbing treatment and the liquid crystal molecules adjacent the liquid crystal alignment film were also aligned in the direction of the rubbing treatment. However, the initial alignment property and display characteristics as excellent as those of the liquid crystal display device T were not obtained. Then, the rubbing conditions in the rubbing step were changed and strong rubbing was performed, with the result that characteristics closer to those of the liquid crystal display device T of Example 17 were obtained. In this case, however, rubbing dust was observed at the surface of the liquid crystal alignment film. From the foregoing, it is apparent that, by preliminarily adjusting the direction of drainage of the cleaning agent to be parallel with the direction of the rubbing treatment, less strong rubbing than in the conventional rubbing treatment is performed appropriately and the liquid crystal alignment film is prevented from being scraped. This is because the film constituent molecules becomes more likely to be aligned by the rubbing treatment as a result of preliminarily and temporarily aligning the film constituent molecules of the liquid crystal alignment film by draining the cleaning agent prior to the rubbing treatment such that the film constituent molecules are in parallel relation with the direction of the rubbing treatment.

[Experiment 2]

Although each of the foregoing examples has described the case where the non-aqueous solvent was used as the cleaning agent in the cleaning step, water was used as a cleaning agent in the present experiment. In accordance with the method used for the experiment, liquid crystal alignment film was formed in the same manner as in Example 14 except that the cleaning step was performed by using water as the cleaning agent. Further, the outer appearance of the liquid crystal alignment film formed was observed by the naked eye.

As a result of observing the substrate fabricated in the cleaning step, a white product apparently resulting from the reaction between water and the silane-based compound was recognized, which could not be removed. From the foregoing, it can be concluded that the cleaning step is preferably performed by using the non-aqueous solvent containing no water as the solvent.

EXAMPLE 18

A liquid crystal display device was fabricated in the same manner as in Example 14 except that N-methyl-2-pyrrolidinone was used in place of chloroform as the cleaning agent in the cleaning step.

In the present example, the removability of the unreacted silane-based compound present in excess in the cleaning step was observed. It was found that N-methyl-2-pyrrolidinone used in the present example was excellent in removability compared with chloroform used in Example 14.

Therefore, the use of N-methyl-2-pyrrolidinone in the cleaning step can improve massproducibility if consideration is given to the safety of the chemical.

EXAMPLE 19

A liquid crystal display device U according to Example 19 was fabricated in the same manner as in Example 14 except that a mixture obtained by mixing 1 mol % of $C_8F_{17}C_2H_4SiCl_3$ at a mixture ratio in $C_6H_5$—CH=CH—CO—$C_6H_4$—O—$(CH_2)_6$—O—$SiCl_3$ (containing a chalconyl group) was used as the silane-based compound (thin-film component).

EXAMPLE 20

A TN-type liquid crystal display device V according to Example 20 was fabricated in the same manner as in Example 14 except that the dose of the polarized UV light was adjusted to 100 mJ/cm$^2$, not to 400 mJ/cm$^2$, in the polarization alignment step.

EXAMPLE 21

A TN-type liquid crystal display device W according to Example 21 was fabricated in the same manner as in Example 14 except that the dose of the polarized UV light was adjusted to 1000 mJ/cm$^2$, not to 400 mJ/cm$^2$, in the polarization alignment step.

[Alignment Mode of Liquid Crystal]

The pretilt angle of a liquid crystal molecule adjacent the liquid crystal alignment film was examined in each of the liquid crystal display devices U, V, W, and O according to Examples 19, 20, 21, and 14, respectively, the results of which are shown in Table 6.

TABLE 6

| | Liquid crystal Display device | | | |
|---|---|---|---|---|
| | O | U | V | W |
| Pretilt Angle | 3 to 5° | 85 to 90° | 5 to 10° | 1° or less |
| Alignment | Pretilt | Homeotropic | Pretilt | Homogeneous |

From the foregoing, it is apparent that the liquid crystal alignment film in which a homeotropic alignment is achievable can be formed by mixing 5 mol % or less of a silane-based compound having a fluoroalkyl group in the silane-based compound.

It was observed that the irradiation of the functional film of the present invention with polarized UV light at a dose of 1 J/cm$^2$ (wavelength: 365 nm) in the polarization alignment step enabled the formation of the liquid crystal alignment film in which a homogenous alignment is achievable. It was also observed that a pretilt alignment with a pretilt angle of 5 to 10 optimum for a TN liquid crystal was achievable at a dose of 100 J/cm$^2$ or less.

While the specific embodiments have been described in detail, such description is strictly for the purpose of clarifying the art of the present invention. It is to be understood that the present invention is not construed as limited to the specific embodiments and various changes and modifications may be made in practicing the invention without departing from the spirit thereof and the scope of the following claims.

INDUSTRIAL APPLICABILITY

As described above, the present invention has adopted the fabrication method wherein the underlying layer having hydroxyl groups or the like is formed on a base material such as a glass plate, the silane-based compound is chemically adsorbed to the surface of the underlying layer which is not sintered, and then sintering is performed. The fabrication method allows a larger number of active hydrogens to be present at a surface of the underlying layer. The contact of the silane-based compound with the underlying layer allows high-density chemical bonding of the molecules of the silane-based compound.

In accordance with the present invention, the underlying layer is set strongly and bonded securely to the base material by sintering performed at the final stage of fabrication. The fabrication method of the present invention allows the formation of a functional film bonded and fixed uniformly and strongly to the base material. Such a functional film exerts a desired surface-property modifying effect such as water repellency or a liquid crystal aligning property over a long period of time.

In accordance with the present invention, a compound represented by X—$(SiOX)_n$—$SiX_2$ (where X is at least one functional group selected from the group consisting of a halogen, an alkoxy group, and an isocyanate group and n is an integer equal to or more than 0) is used as an underlying layer forming component. The use of the compound allows the formation of a remarkably solid underlying layer and hence allows the fabrication of a functional film excellent in water repellency and rubbing resistance.

In another embodiment of the present invention, a compound represented by X'—$(AlOX')_n$—$AlX'_2$ (where X' is an alkoxy group and n is an integer equal to or more than 0) is used as an underlying layer forming component. The use of the compound allows the formation of a remarkably solid underlying layer and hence allows the fabrication of a functional film excellent in water repellency and rubbing resistance.

In still another embodiment of the present invention, a two-component underlying layer forming component obtained by mixing a compound represented by X—$(SiOX_2)_n$—$SiX_3$ (where X is at least one functional group selected from the group consisting of a halogen, an alkoxy group, and an isocyanate group and n is an integer equal to or more than 0) and a compound represented by X'—$(AlOX')_n$—$AlX'_2$ (where X' is an alkoxy group and n is an integer equal to or more than 0) is used as an underlying layer forming component. This allows the formation of an excellent functional film having a desired surface-property modifying effect such as water repellency, which is resistant to heat degradation.

If a drainage drying method and a polarized light irradiation method using UV light are applied to the functional film, a liquid crystal alignment film having a desired liquid crystal alignment property is obtained.

If such a liquid crystal alignment film according to the present invention is used, a liquid crystal display device with excellent display performance can be provided.

The fabrication method using X'—$(AlOX')_n$—$AlX'_2$ alone as the underlying layer forming component is properly applicable to, e.g., a cooking tool or the like which requires abrasive cleaning. The fabrication method using the two-component underlying layer forming solution containing X'—$(AlOX')_n$—$AlX'_2$ and X—$(SiOX_2)_n$—$SiX_3$ is properly applicable to, e.g., the bottom portion of an electric iron. The application provides an iron having a crease-removing function less likely to degrade over a long period of time. Hence, the present invention has great industrial significance.

What is claimed is:

1. A functional film comprising:
an underlying layer formed on a surface of a base material and composed of a hydrolyzable compound represented by X—(SiOX$_2$)$_n$—SiX$_3$ where X is at least one functional group selected from the group consisting of a halogen, an alkoxy group, and an isocyanate group and n is an integer equal to or more than 0; and
a thin film provided on the underlying layer and composed of a group of molecules of a silane-based compound chemically adsorbed to a surface of the underlying layer,
constituent molecules composing the underlying layer being fixed by chemical bonding to the surface of the base material and to the molecules of the silane-based compound,
among portions of active hydrogens incorporated into the constituent molecules by hydrolyzing the compound, those portions remaining without being chemically bonded to the molecules of the silane-based compound being chemically bonded to each other such that the constituent molecules are bonded fixedly to each other to have a structural unit represented by the following structural formula (1)

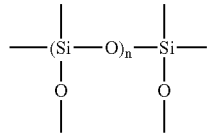
(1)

where n is an integer equal to or more than 0, the molecules of the silane-based compound having a straight carbon chain containing a photosensitive group, the photosensitive group in the straight carbon chain is polymerized fixedly in a desired direction, and
the photosensitive group is a cinnamoyl group represented by the following chemical formula (3) or a chalconyl group represented by the following chemical formula (4)

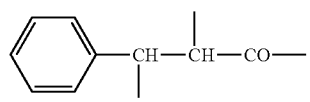
(3)

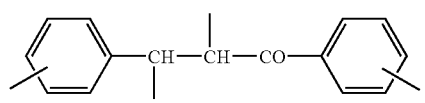
(4)

2. The functional film of claim 1, wherein each of the molecules of the silane-based compound is a molecule of a trichlorosilane-based compound.

3. The functional film of claim 1, wherein the straight carbon chain has an alkyl group or a fluoroalkyl group.

4. The functional film of claim 1, wherein the thin film is a thin film configured as a single molecular layer.

5. The functional film of claim 1, wherein the group of molecules of the silane-based compound composing the functional film are aligned in a given direction.

6. The functional film of claim 1, wherein the base material is one selected from the group consisting of glass, stainless steel, and an aluminum oxide.

7. A method of fabricating a functional film, the method comprising:
an underlying-layer forming step of forming an underlying layer composed of a group of constituent molecules having a plurality of portions of active hydrogens and independent of each other by bringing, into contact with a surface of a base material, an underlying layer solution containing a hydrolyzable compound represented by X—(SiOX$_2$)$_n$—SiX$_3$ where X is at least one functional group selected from the group consisting of a halogen, an alkoxy group, and an isocyanate group and n is an integer equal to or more than 0 and drying the underlying layer solution, whereby the compound is hydrolyzed;
a thin-film forming step of forming a thin film composed of a group of molecules of a silane-based compound on a surface of the underlying layer by bringing a solution containing the silane-based compound into contact with the surface of the base material formed with the underlying layer to cause chemical adsorption of each of molecules of the silane-based compound to at least one of the portions of active hydrogens in the constituent molecules; and
a sintering step of sintering the base material after the thin-film forming step to cause, of the portions of active hydrogens in the constituent molecules, those ones remaining without chemically adsorbing the molecules of the silane-based compound to be bonded to each other and to the portions of active hydrogens present at the surface of the base material.

8. The method of claim 7, wherein the compound represented by X—(SiOX$_2$)$_n$—SiX$_3$ is alkoxysilane.

9. The method of claim 7, wherein the drying in the underlying-layer forming step includes evaporating a solvent contained in the underlying layer solution.

10. The method of claim 9, wherein the drying in the underlying-layer forming step is performed at a temperature less than 300° C.

11. The method of claim 7, wherein the sintering step includes causing polymerization and setting of constituent molecules of the underlying layer.

12. The method of claim 11, wherein the sintering in the sintering step is performed at a temperature more than 300° C.

13. The method of claim 7, wherein a trichlorosilane-based compound is used as the silane-based compound for forming the thin film.

14. The method of claim 7, wherein a silane-based compound having an alkyl group or a fluoroalkyl group is used as the silane-based compound for forming the thin film.

15. The method of claim 7, wherein a non-aqueous solvent is used as a solvent of the thin-film forming solution.

16. The method of claim 15, wherein the non-aqueous solvent is silicone.

17. The method of claim 7, wherein the thin-film forming solution is brought into contact with the surface of the base material in an atmosphere at a relative humidity of 35% or less.

18. The method of claim 7, the method further comprising:
a cleaning step of removing unadsorbed molecules of the silane-based compound after the sintering step.

19. The method of claim 18, wherein a non-aqueous solvent is used as a cleaning agent in the cleaning step.

20. The method of claim 19, wherein chloroform is used as the non-aqueous solvent in the cleaning step.

21. The method of claim 19, wherein N-methyl-2-pyrrolidinone is used as the non-aqueous solvent in the cleaning step.

22. A liquid crystal display device comprising:
a pair of substrates disposed in opposing relation, each of the pair of substrates having a liquid crystal alignment film internally of at least one of the pair of substrates;
a liquid crystal layer provided between the pair of substrates and having a given alignment structure due to the liquid crystal alignment film,
the liquid crystal alignment film having:
an underlying layer formed on a surface of a base material and composed of a hydrolyzable compound represented by

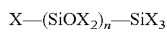

where X is at least one functional group selected from the group consisting of a halogen, an alkoxy group, and an isocyanate group and n is an integer equal to or more than 0; and
a thin film provided on the underlying layer and composed of a group of molecules of a silane-based compound chemically adsorbed to a surface of the underlying layer,
constituent molecules composing the underlying layer being fixed by chemical bonding to the surface of the base material and to the molecules of the silane-based compound,
among portions of active hydrogens incorporated into the constituent molecules by hydrolyzing the compound, those portions remaining without being chemically bonded to the molecules of the silane-based compound being chemically bonded to each other such that the constituent molecules are bonded fixedly to each other to have a structural unit represented by the following structural formula (1)

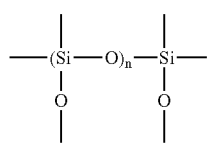

where n is an integer equal to or more than 0, the molecules of the silane-based compound having a straight carbon chain containing a photosensitive group, the photosensitive group in the straight carbon chain is polymerized fixedly in a desired direction, and
the photosensitive group is a cinnamoyl group represented by the following chemical formula (3) or a chalconyl group represented by the following chemical formula (4)

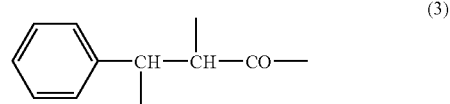

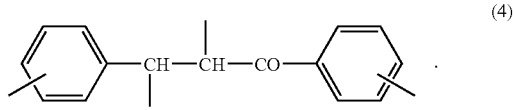

23. The liquid crystal display device of claim 22, wherein the group of the molecules of the silane-based compound composing the liquid crystal alignment film are aligned in a given direction or in a plurality of directions to form a pattern.

24. The liquid crystal display device of claim 22, wherein the liquid crystal layer has a pretilt alignment.

25. The liquid crystal display device of claim 22, wherein the liquid crystal layer has a homogeneous alignment.

26. The liquid crystal display device of claim 22, wherein the liquid crystal layer has a homeo tropic alignment.

27. The liquid crystal display device of claim 22, which is a liquid crystal display device of inplane switching type, wherein electrodes opposed to each other are formed on a surface of one of the substrates.

28. A method of fabricating a liquid crystal display device comprising:
a pair of substrates having a liquid crystal alignment film internally of at least one of the pair of substrates; and
a liquid crystal layer provided between the pair of substrates and having a given alignment structure due to the liquid crystal alignment film,
the method comprising:
an underlying-layer forming step of forming an underlying layer composed of a group of constituent molecules having a plurality of portions of active hydrogens and independent of each other by bringing, into contact with a surface of each of the substrates, an underlying layer solution containing a hydrolyzable compound represented by

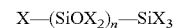

where X is at least one functional group selected from the group consisting of a halogen, an alkoxy group, and an isocyanate group and n is an integer equal to or more than 0 and drying the underlying layer solution, whereby the compound is hydrolyzed;
a thin-film forming step of forming a thin film composed of a group of molecules of a silane-based compound on a surface of the underlying layer by bringing a solution containing the silane-based compound into contact with the surface of the underlying layer to cause chemical adsorption of each of molecules of the silane-based compound to at least one of the portions of active hydrogens in the constituent molecules and thereby forming the liquid crystal alignment film composed of the underlying layer and the thin film;
a sintering step of sintering the base material after the thin-film forming step to cause, of the portions of active hydrogens in the constituent molecules, those ones remaining without chemically adsorbing the molecules of the silane-based compound to be bonded to each other and to the portions of active hydrogens present at the surface of the base material; and an alignment treatment step of performing an alignment treatment with respect to the liquid crystal alignment film.

29. The method of claim 28, further comprising a cleaning step of removing unadsorbed molecules of the silane-based compound after the sintering step.

30. The method of claim 29, wherein a non-aqueous solvent is used as a cleaning agent in the cleaning step.

31. The method of claim 30, wherein chloroform is used as the non-aqueous solvent.

32. The method of claim 30, wherein N-methyl-2-pyrrolidinone is used as the non-aqueous solvent.

33. The method of claim 29, further comprising, after the cleaning step, a drainage alignment step of draining the cleaning agent in a desired direction of drainage and thereby aligning the molecules of the silane-based compound composing the liquid crystal alignment film in the direction of drainage.

34. The method of claim 28, wherein the alignment treatment step is a rubbing alignment step of aligning the molecules of the silane-based compound in the liquid crystal alignment film in a desired direction by a rubbing treatment.

35. The method of claim 28, wherein, if the thin film in the liquid crystal alignment film is composed of the group of molecules of the silane-based compound each having a photosensitive group, the alignment treatment step is a polarized-light alignment step of irradiating the surface of the substrate formed with the liquid crystal alignment film with polarized light to cause a crosslinking reaction between the molecules of the silane-based compound and thereby exerting an alignment regulating force which enables liquid crystal molecules to be aligned in a specified direction.

36. The method of claim 35, wherein an intensity of the polarized light used for irradiation in the polarized-light alignment step is 1 $J/cm^2$ or more at a wavelength of 365 nm.

37. The method of claim 28, wherein a 5 mol % or less of silane-based compound having a fluoroalkyl group is mixed in the solution containing the silane-based compound.

* * * * *